United States Patent
Tsukazaki

(10) Patent No.: US 9,058,507 B2
(45) Date of Patent: Jun. 16, 2015

(54) SIGNAL PROCESSOR WITH AN ENCRYPTING OR DECRYPTING DEVICE IN A MEMORY SYSTEM

(75) Inventor: Fumiaki Tsukazaki, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 2204 days.

(21) Appl. No.: 12/018,618

(22) Filed: Jan. 23, 2008

(65) Prior Publication Data
US 2008/0199005 A1     Aug. 21, 2008

(30) Foreign Application Priority Data

Feb. 20, 2007  (JP) ................................ 2007-038744

(51) Int. Cl.
| | |
|---|---|
| H04L 9/00 | (2006.01) |
| H04L 9/28 | (2006.01) |
| H04K 1/06 | (2006.01) |
| G06F 21/72 | (2013.01) |
| H04L 9/08 | (2006.01) |
| H04L 9/14 | (2006.01) |

(52) U.S. Cl.
CPC .............. *G06F 21/72* (2013.01); *H04L 9/0877* (2013.01); *H04L 9/0894* (2013.01); *H04L 9/14* (2013.01)

(58) Field of Classification Search
USPC ........................... 380/44, 28, 37, 45; 713/165
See application file for complete search history.

(56) References Cited

U.S. PATENT DOCUMENTS

| | | | |
|---|---|---|---|
| 4,811,393 A | 3/1989 | Hazard | |
| 2006/0174349 A1* | 8/2006 | Cronce et al. | 726/26 |
| 2008/0052533 A1* | 2/2008 | Iida et al. | 713/189 |

FOREIGN PATENT DOCUMENTS

| | | |
|---|---|---|
| JP | 1-500933 | 3/1989 |
| JP | 2-130044 | 5/1990 |
| JP | 3-80645 A | 4/1991 |
| JP | 4-72841 | 3/1992 |
| JP | 6-102820 | 4/1994 |
| JP | 9-238132 A | 9/1997 |
| JP | 9-307546 | 11/1997 |
| JP | 2003-288009 | 10/2003 |
| JP | 2004-186939 | 7/2004 |
| JP | 2006-511893 A | 4/2006 |
| JP | 2006-164236 | 6/2006 |

OTHER PUBLICATIONS

Office Action issued on Sep. 13, 2013 in the corresponding Japanese Patent Application No. 2007-038744 (with English Translation).
Office Action mailed Jun. 6, 2012 in Japanese Application No. 2007-038744 filed Feb. 20, 2007 (w/English translation).

* cited by examiner

*Primary Examiner* — Aravind Moorthy
(74) *Attorney, Agent, or Firm* — Oblon, McClelland, Maier & Neustadt, L.L.P.

(57) ABSTRACT

Original data to be a source for an encryption key is read from a memory cell array and stored in a buffer region. An encryption key generation unit generates a plurality of encryption keys by variously modifying the original data read from the buffer region based on a predetermined generation rule. The encryption unit generates an encrypted command by encrypting commands individually with an encryption key different for each command, out of the plurality of encryption keys generated by the encryption key generation unit.

20 Claims, 20 Drawing Sheets

FIG. 7

8 BYTES

8 BYTES

8 BYTES

| 20 | K0 | K1 | K2 | K3 | K4 | K5 | K6 | K7 |
| 22A | K0 | K0 | K0 | K0 | K0 | K0 | K0 | K0 |
| 22B | K2 | K2 | K2 | K2 | K2 | K2 | K2 | K2 |
| 22C | K1 | K1 | K1 | K1 | K4 | K4 | K4 | K4 |
| 22D | K3 | K3 | K3 | K3 | K6 | K6 | K6 | K6 |
| 22E | K0 | K0 | K2 | K2 | K4 | K4 | K6 | K6 |
| 22F | K1 | K1 | K3 | K3 | K5 | K5 | K7 | K7 |

8 BYTES

| 20 | K0 | K1 | K2 | K3 | K4 | K5 | K6 | K7 |
| D5 | L0 | L1 | L2 | L3 | L4 | L5 | L6 | L7 |
| 22A | M0 | M1 | M2 | M3 | M4 | M5 | M6 | M7 |
| 22B | M0 | K1 | K2 | K3 | K4 | K5 | K6 | K7 |
| 22C | K0 | M1 | K2 | K3 | K4 | K5 | K6 | K7 |
| 22D | N0 | N1 | N2 | N3 | N4 | N5 | N6 | N7 |
| 22E | N0 | K1 | K2 | K3 | K4 | K5 | K6 | K7 |

| INDEX VALUE | KEY INFORMATION |
|---|---|
| 0 | A0 |
| 1 | A1 |
| 2 | A2 |
| 3 | A3 |
| ⋮ | ⋮ |
| n | An |

| INDEX VALUE | KEY INFORMATION |
|---|---|
| 0 | B0 |
| 1 | B1 |
| 2 | B2 |
| 3 | B3 |
| ⋮ | ⋮ |
| n | Bn |

| INDEX VALUE | KEY INFORMATION |
|---|---|
| 0 | 22D |
| 1 | 22E |
| 2 | 22F |
| 3 | 22G |
| 4 | 22H |
| 5 | 22I |

SIGNAL PROCESSOR WITH AN ENCRYPTING OR DECRYPTING DEVICE IN A MEMORY SYSTEM

BACKGROUND OF THE INVENTION

1. Field of the Invention

The present invention relates to a signal processor, and more particularly, to an encrypting device and a decrypting device in a memory system.

2. Description of the Background Art

Japanese Patent Application Publication No. 2006-164236 discloses a signal processor which stores a data table in a memory cell array of a semiconductor memory, where key information for encryption and decryption is described in the data table, and reads the key information by specifying an index value of the data table to perform encryption or decryption with the key information.

For better security, the key information is changed desirably per command or data set. In the signal processor disclosed in the Japanese Patent Application Publication No. 2006-164236, a data table is stored in a memory cell array. Describing a plurality of key information items in the data table results in increasing the whole volume of the data table in proportion to the number of the key information items. It causes an increase of an area to be secured for storing the data table in the memory cell array, and thus a decrease in storage capacity of an area for storing data.

SUMMARY OF THE INVENTION

It is an object of the present invention to provide a signal processor with high security by allowing the signal processor to process a plurality of key information items for encryption and decryption, while minimizing addition of a resource.

According to a first aspect of the present invention, a signal processor includes a key information generation unit generating a plurality of key information items by variously modifying original data, which is read from a memory unit for storing the original data to be a source for the key information, based on a predetermined rule, and a processing unit generating encrypted bit strings by encrypting bit strings, each bit string being encrypted with each item of the plurality of key information items generated by the key information generation unit.

The original data which is a source for the key information is stored in the memory unit, and the key information generation unit variously modifies the original data which is read from the memory unit, to generate the plurality of key information items. Then, the processing unit encrypts each bit string with different key information. Consequently, since it is not required to store the plurality of key information items in the memory unit, it is possible to process the plurality of key information items, while minimizing addition of a resource, and security is improved.

According to a second aspect of the present invention, a signal processor includes a key information generation unit generating a plurality of key information items by variously modifying original data, which is read from a memory unit for storing the original data to be a source for the key information, based on a predetermined rule, and a processing unit generating decrypted bit strings by decrypting encrypted bit strings, each encrypted bit string being decrypted with each item of the plurality of key information items generated by the key information generation unit.

The original data to be a source for the key information is stored in the memory unit, and the key information generation unit variously modifies the original data which is read from the memory unit, to generate the plurality of key information items. Then, the processing unit decrypts each encrypted bit string with different key information. Consequently, since it is not required to store the plurality of key information items in the memory unit, it is possible to process the plurality of key information items, while minimizing addition of a resource, and security is improved.

Preferably, the key information generation unit includes a buffer region which the processing unit refers to, and the key information generation unit produces a key information table having the plurality of key information items sectioned and arranged with an index value by each key information item, and stores the key information table in the buffer region.

The key information generation unit produces the key information table in which the plurality of key information items is described, and stores this key information table in the buffer region. Consequently, changing the key information requires only selecting other key information from the key information table. Since there is no need to newly generate key information, processing speed can be enhanced.

Preferably, the processing unit designates the index value by a predetermined parameter for reading a key information item corresponding to this index value from the buffer region, and the key information generation unit further includes a modifying unit modifying the parameter inputted from the processing unit to change to another parameter.

The modifying unit of the key information generation unit modifies the parameter inputted from the processing unit to change the parameter to another parameter. Consequently, even if the parameter outputted from the processing unit gets cracked by a third party, the parameter is changed to another parameter by the modifying unit, and security is thus improved.

Preferably, the processing unit includes a modifying unit modifying the key information inputted from the key information generation unit to change to another key information item.

The modifying unit of the processing unit modifies the key information item inputted from the key information generation unit to change the key information to another key information item. Consequently, even if the key information outputted from the key information generation unit gets cracked by a third party, the key information is changed to other key information by the modifying unit, and security is thus improved.

Preferably, the key information generation unit defines a certain group of key information items out of the plurality of key information items which can be generated as key information available for the processing unit, the processing unit inputs a predetermined parameter to the key information generation unit for designating a specific key information item to be used out of the group of key information items, and the key information generation unit selects the specific key information item out of the group of key information items based on the parameter and defined information of the key information items in the plurality of key information items, to input to the processing unit.

The key information generation unit selects the specific key information item to be used out of the key information items, based on the parameter inputted from the processing unit and the defined information of the group of key information items in the plurality of key information items. Consequently, as it is not required to provide the key information generation unit with a buffer region for storing a key information table, the signal processor can be simplified as a whole.

Preferably, the key information has a first data length, the original data has a second data length which is longer than the first data length, the key information generation unit generates the key information by extracting sectional data of first-data-length long from the second data length, and the key information generation unit generates the plurality of key information items by varying sections to be extracted for the sectional data.

The plurality of key information items can be simply and reliably obtained from one set of original data.

Preferably, the key information generation unit generates the plurality of key information items by shuffling a bit sequence of the original data.

The plurality of key information items can be simply and reliably obtained from one set of original data.

Preferably, the key information generation unit generates the plurality of key information items by replacing at least a section of a bit sequence of the original data with a bit sequence of a specific section of the original data.

The plurality of key information items can be simply and reliably obtained from one set of original data.

Preferably, the key information generation unit generates key information to be used in a present process in the processing unit by performing a predetermined operation on the original data with a predetermined bit string.

The plurality of key information items can be simply and reliably obtained from one set of original data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram illustrating a second example of a method for modifying original data of the signal processor according to the first preferred embodiment of the present invention.

FIG. 8 is a diagram illustrating a second example of a method for modifying original data of the signal processor according to the first preferred embodiment of the present invention.

FIG. 9 is a diagram illustrating a third example of a method for modifying original data of the signal processor according to the first preferred embodiment of the present invention.

FIG. 10 is a diagram illustrating a fourth example of a method for modifying original data of the signal processor according to the first preferred embodiment of the present invention.

FIG. 13 is a diagram showing a key information table of the signal processor according to the second preferred embodiment of the present invention.

FIG. 16 is a diagram showing a key information table of the signal processor according to the second preferred embodiment of the present invention.

FIG. 28 is a diagram showing a virtual key information table.

DESCRIPTION OF THE PREFERRED EMBODIMENTS

Figure 1:
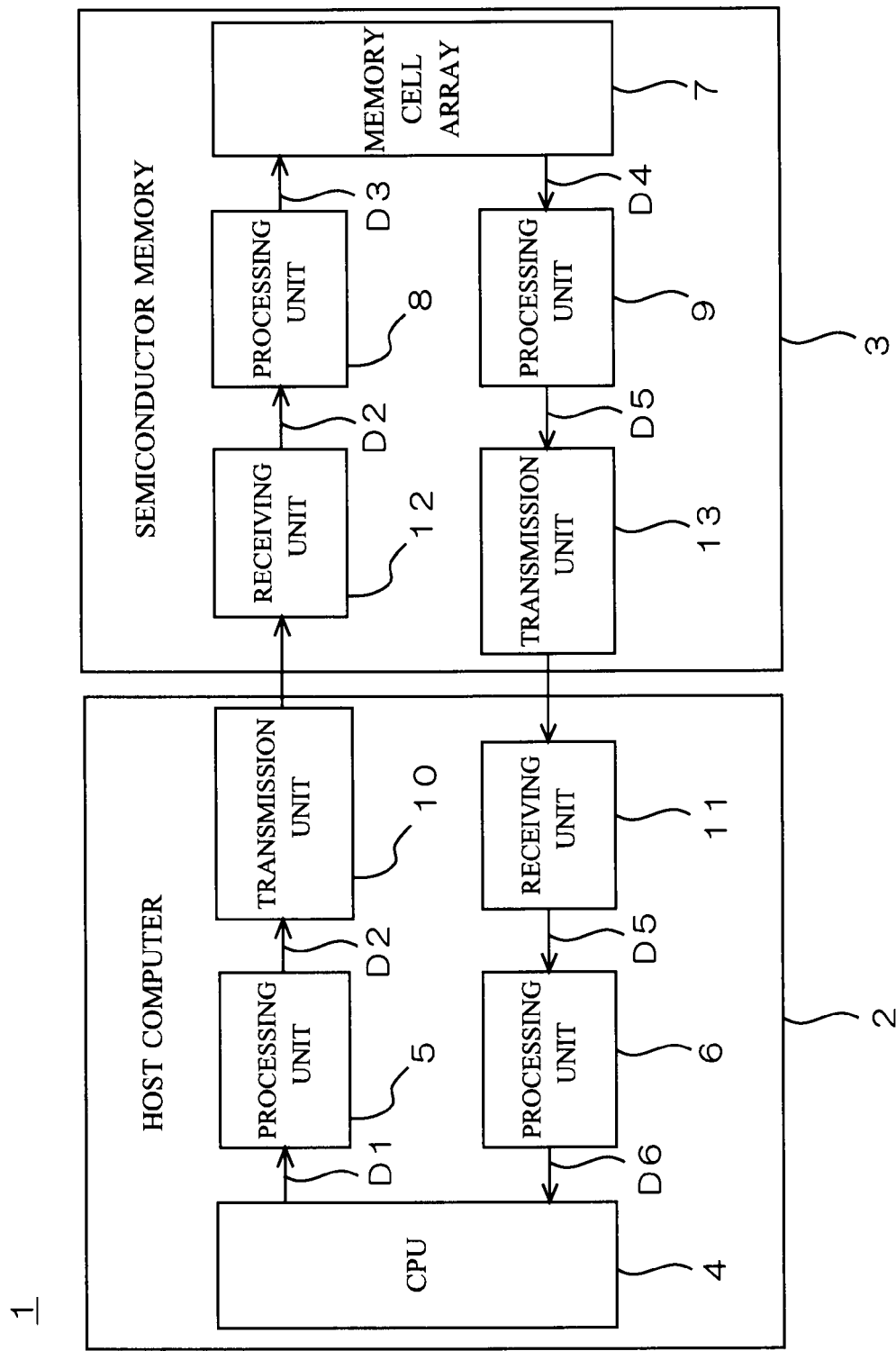
FIG. 1 is a block diagram showing an overall configuration of a signal processor according to a first preferred embodiment of the present invention.

Preferred embodiments of the present invention are described in detail below referring to the drawings. It should be noted that identical reference numerals throughout the drawings indicate identical or equivalent elements.

First Preferred Embodiment

FIG. 1 is a block diagram showing an overall configuration of a signal processor 1 according to a first preferred embodiment of the present invention. The signal processor 1 includes a host computer 2 and a semiconductor memory 3. The semiconductor memory 3 is, for example, a memory card which is detachably connected to the host computer 2.

As shown in FIG. 1, the host computer 2 includes a CPU 4, processing units 5 and 6, a transmission unit 10, and a receiving unit 11. The semiconductor memory 3 includes a memory cell array 7, processing units 8 and 9, a receiving unit 12, and a transmission unit 13.

The present invention is illustrated below with an example of the host computer 2 reading data stored in the memory cell array 7. The present invention, however, is applicable not only to reading data from the memory cell array 7 but also to other processes such as writing data to the memory cell array 7.

Referring to FIG. 1, the CPU 4 outputs a command D1 for reading data. The command D1 is inputted to the processing unit 5. The processing unit 5 encrypts the command D1 as described below and outputs an encrypted command D2. The command D2 is routed through the transmission unit 10, and then the receiving unit 12 of the semiconductor memory 3, and is inputted to the processing unit 8. The processing unit 8 decrypts the command D2 as described below and outputs a decrypted command D3. The decrypted command D3 is inputted to the memory cell array 7. In detail, the decrypted command D3 is inputted to an access controller (not shown) and the access controller analyzes the command D3 and inputs a Read request and an address to the memory cell array 7.

The memory cell array 7 is then accessed to read data D4 corresponding to the address described in the command D3. The data D4 is inputted to the processing unit 9. The processing unit 9 encrypts the data D4 as described below and outputs encrypted data D5. The data D5 is routed through the transmission unit 13, and then the receiving unit 11 of the host computer 2, and is inputted to the processing unit 6. The processing unit 6 decrypts the data D5 as described below and outputs decrypted data D6. The data D6 is inputted to the CPU 4.

Figure 2:
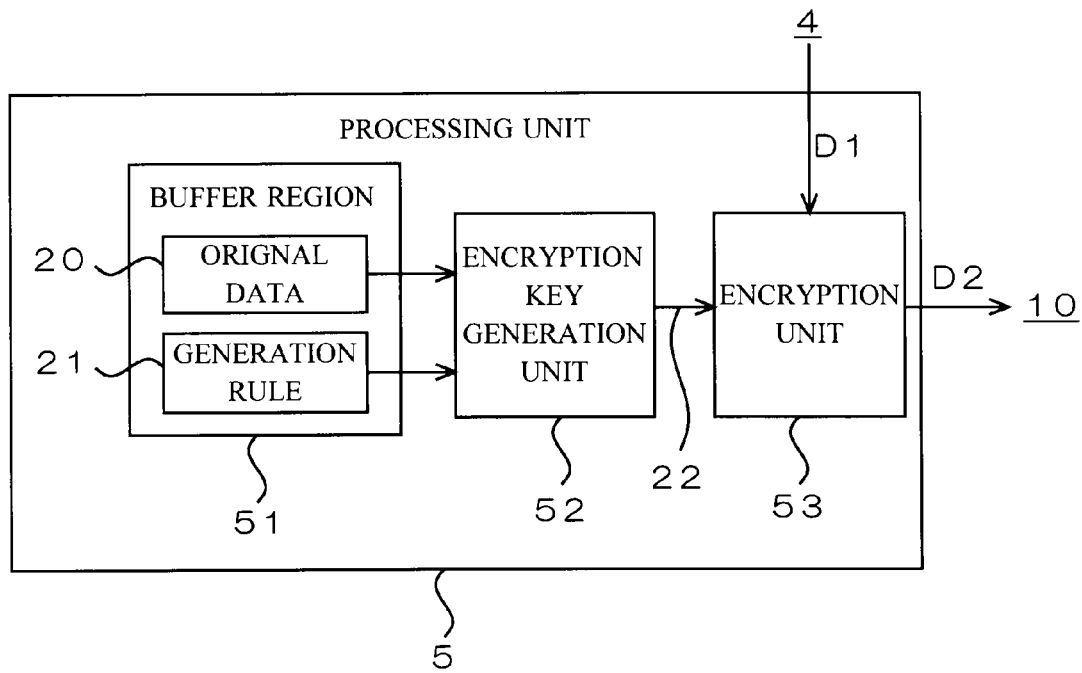
FIG. 2 is a block diagram showing a configuration of a processing unit shown in FIG. 1 of the signal processor according to the first preferred embodiment of the present invention.
Figure 3:
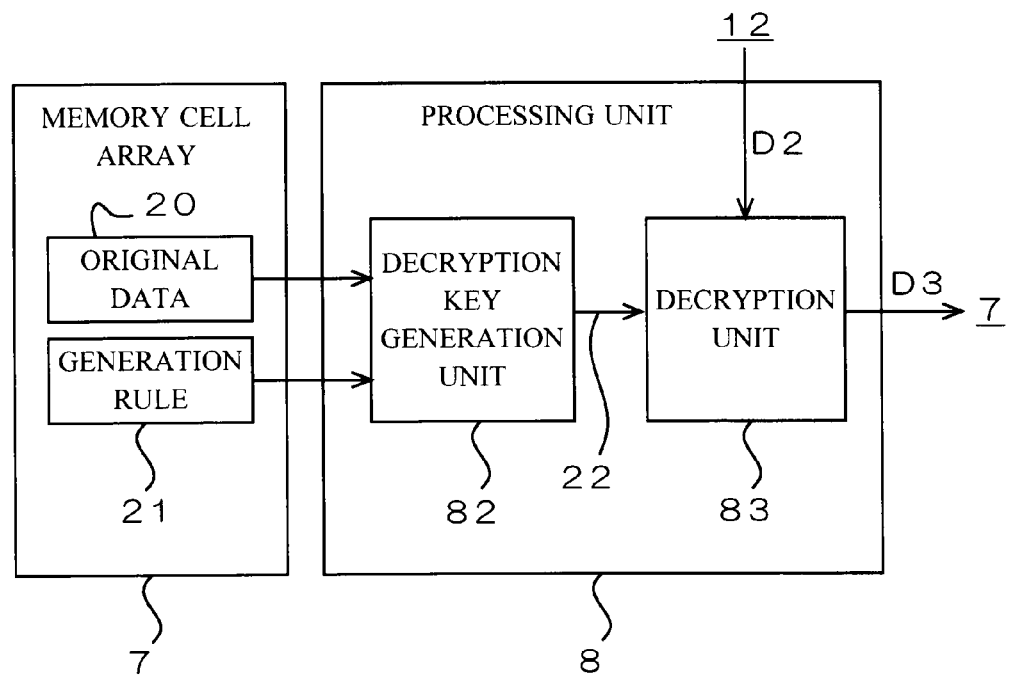
FIG. 3 is a block diagram showing a configuration of a processing unit and a memory cell array shown in FIG. 1 of the signal processor according to the first preferred embodiment of the present invention.

FIG. 2 is a block diagram showing a configuration of the processing unit 5 in FIG. 1 of the signal processor 1 according to the first preferred embodiment. The processing unit 5 includes a buffer region 51, an encryption key generation unit 52, and an encryption unit 53. Stored in the buffer region 51 are one set of original data 20 to be a source for an encryption key (i.e. encryption key information) and a generation rule 21 for generating the encryption key by modifying the original data 20. The original data 20 and the generation rule 21 are stored in advance in the memory cell array 7 of the semiconductor memory 3 as shown in FIG. 3 described below. Immediately after the signal processor 1 is turned on, the original data 20 and the generation rule 21 are read from the memory cell array 7 and copied to the buffer region 51. Here, instead of copying the original data 20 and the generation rule 21 themselves, information necessary to produce the original data 20 and the generation rule 21 may be transmitted from the memory cell array 7 to the host computer 2, so that the original data 20 and the generation rule 21 are produced within the host computer 2 based on the information, and then stored in the buffer region 51. Alternatively, the original data 20 and the generation rule 21 may be stored in advance in a nonvolatile memory such as a ROM (not shown) in the host computer 2, so that immediately after the signal processor 1 is turned on, the original data 20 and the generation rule 21 are read from the nonvolatile memory, and then stored in the buffer region 51. In this case, since the original data 20 and the generation rule 21 are not required transmitting from the semiconductor memory 3 to the host computer 2, security is improved.

The encryption key generation unit 52 reads the original data 20 and the generation rule 21 from the buffer region 51, and modifies the original data 20 variously to generate a plurality of encryption keys 22. A method for modifying the original data 20 defined as the generation rule 21 is described later.

The plurality of encryption keys 22 is inputted to the encryption unit 53 in sequence. The command D1 is inputted to the encryption unit 53 from the CPU 4 in FIG. 1. The encryption unit 53 outputs the encrypted command D2 by encrypting the command D1 with the encryption key 22. When the commands D1 is inputted a plurality of times, this encryption uses a different encryption key 22 for each command D1. In an example of a command D1 with a data length of 8 bytes, a different encryption key 22 is to be used per bit string of 8-byte length (per 8-byte command, in this example).

FIG. 3 is a block diagram showing a configuration of the processing unit 8 and the memory cell array 7 in FIG. 1 of the signal processor 1 according to the first preferred embodiment. In the memory cell array 7, the original data 20 and the generation rule 21 are stored, in addition to data not shown in the figure. The processing unit 8 includes a decryption key generation unit 82 and a decryption unit 83.

The decryption key generation unit 82 reads the original data 20 and the generation rule 21 from the memory cell array 7, and modifies the original data 20 variously based on the generation rule 21 to generate a plurality of decryption keys 22 (equal to the encryption key 22). A method for modifying the original data 20 defined as the generation rule 21 is described later.

The plurality of decryption keys 22 is inputted to the decryption unit 83 in sequence. The command D2 is inputted to the decryption unit 83 from the receiving unit 12 shown in FIG. 1. The decryption unit 83 outputs the decrypted command D3 by decrypting the command D2 with the decryption key 22. When the command D2 is inputted a plurality of times, the decryption uses a different decryption key 22 for each command D2. In an example of the command D2 with a data length of 8 bytes, a different decryption key 22 is to be used per bit string of 8-byte length (per 8-byte command, in this example).

Figure 4:
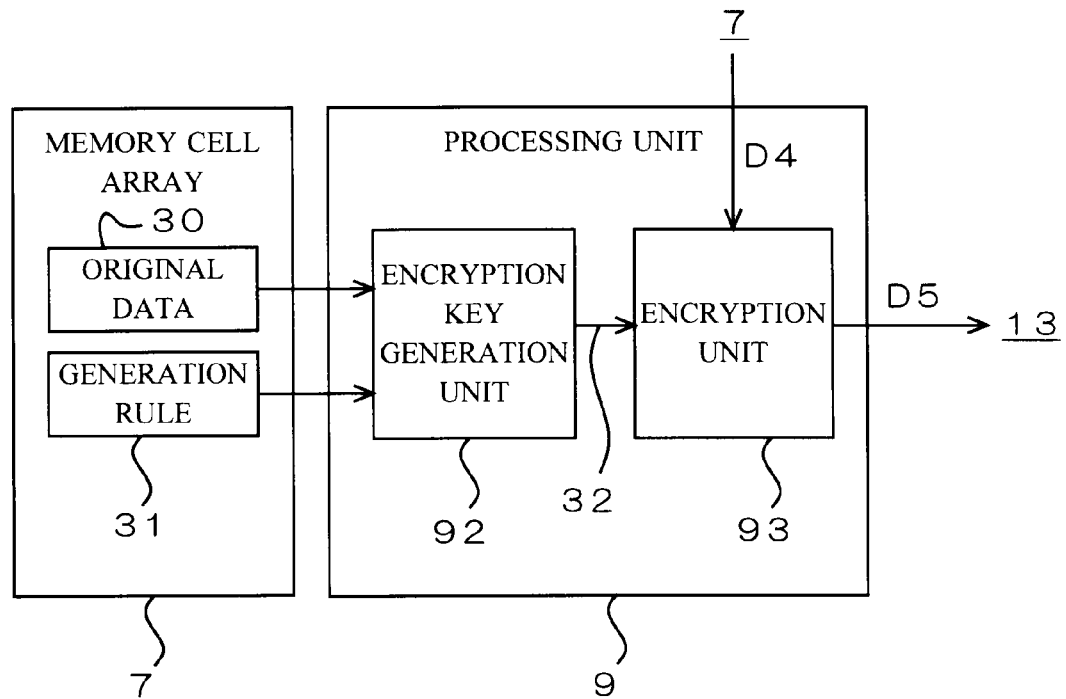
FIG. 4 is a block diagram showing a configuration of a processing unit and a memory cell array shown in FIG. 1 of the signal processor according to the first preferred embodiment of the present invention.

FIG. 4 is a block diagram showing a configuration of the processing unit 9 and the memory cell array 7 in FIG. 1 of the signal processor 1 according to the first preferred embodiment. In the memory cell array 7, one set of original data 30 to be a source for an encryption key (i.e. encryption key information) and a generation rule 31 for generating the encryption key by modifying the original data 30 are stored, in addition to data not shown in the figure. The processing unit 9 includes an encryption key generation unit 92 and an encryption unit 93. The original data 20 may serve as the original data 30, and the generation rule 21 may serve as the generation rule 31.

The encryption key generation unit 92 reads the original data 30 and the generation rule 31 from the memory cell array 7, and modifies the original data 30 variously based on the generation rule 31 to generate a plurality of encryption keys 32. A method for modifying the original data 30 defined as the generation rule 31 is described later.

The plurality of encryption keys 32 is inputted to the encryption unit 93 in sequence. The data D4 is inputted to the encryption unit 93 from the memory cell array 7 shown in FIG. 1. The encryption unit 93 outputs the encrypted data D5 by encrypting the data D4 with the encryption key 32. When the data D4 is inputted a plurality of times, this encryption uses a different encryption key 32 for each set of the data D4. In an example of the data D4 with a data length of 8 bytes, a different encryption key 32 is to be used per bit string of 8-byte length (per 8-byte data, in this example).

Figure 5:
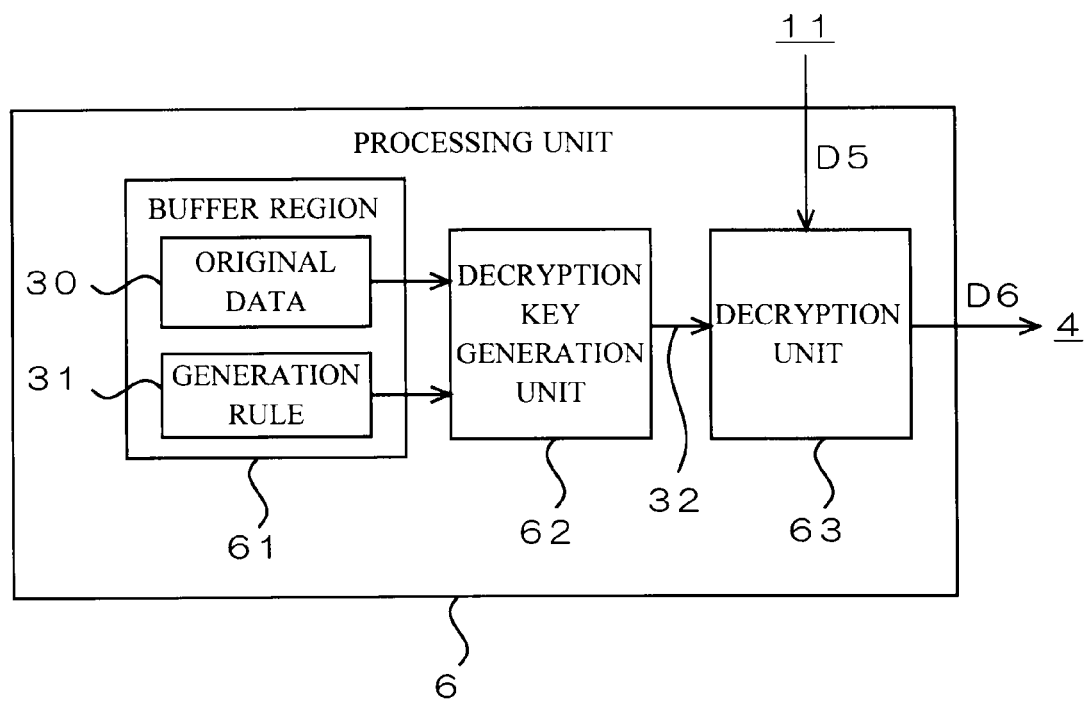
FIG. 5 is a block diagram showing a configuration of a processing unit shown in FIG. 1 of the signal processor according to the first preferred embodiment of the present invention.

FIG. 5 is a block diagram showing a configuration of the processing unit 6 in FIG. 1 of the signal processor 1 according to the first preferred embodiment. The processing unit 6 includes a buffer region 61, a decryption key generation unit 62, and a decryption unit 63. The original data 30 and the generation rule 31 are stored in the buffer region 61. Similar to above, the original data 30 and the generation rule 31 may be stored in advance in the buffer region 61, or the original data 30 and the generation rule 31 stored in the memory cell array 7 (see FIG. 4) may be copied from the memory cell array 7 to the buffer region 61 immediately after the signal processor 1 is turned on. Instead of copying the original data 30 and the generation rule 31 themselves, information necessary for producing the original data 30 and the generation rule 31 may be transmitted from the memory cell array 7 to the host computer 2, so that the original data 30 and the generation rule 31 are produced based on the information within the host computer 2 to be stored in the buffer region 61.

The decryption key generation unit 62 reads the original data 30 and the generation rule 31 from the buffer region 61, and modifies the original data 30 variously based on the generation rule 31 to generate a plurality of decryption keys 32 (equal to the encryption key 32). A method for modifying the original data 30 defined as the generation rule 31 is described later.

The plurality of decryption keys 32 is inputted to the decryption unit 63 in sequence. The data D5 is inputted to the decryption unit 63 from the receiving unit 11 shown in FIG. 1. The decryption unit 63 outputs the decrypted data D6 by decrypting the data D5 with the decryption key 32. When the data D5 is inputted a plurality of times, the decryption uses a different decryption key 32 for each set of the data D5. In an example of the data D5 with a data length of 8 bytes, a different decryption key 32 is to be used per bit string of 8-byte length (per 8-byte data, in this case).

Figure 6:
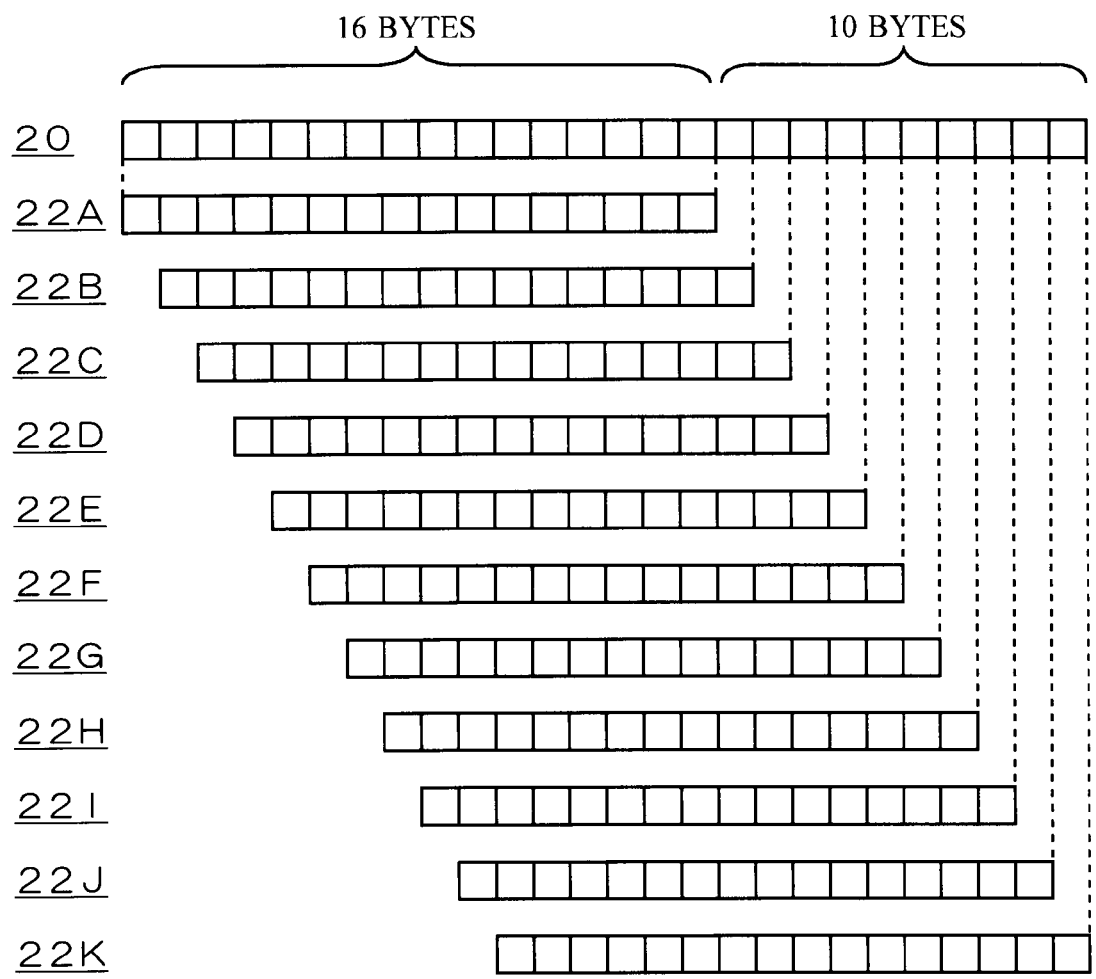
FIG. 6 is a diagram illustrating a first example of a method for modifying original data of the signal processor according to the first preferred embodiment of the present invention.

FIG. 6 is a diagram illustrating a first example of a method for modifying the original data 20 in order to generate the encryption key 22 by the encryption key generation unit 52 shown in FIG. 2. According to the example shown in FIG. 6, the encryption key 22 has a data length of 16 bytes. The original data 20 has a data length longer than that of the encryption key 22, and the data length is 26 bytes according to the example shown in FIG. 6.

The encryption key generation unit 52 generates the encryption key 22 of 16-byte long, by extracting sectional data of 16 bytes from the original data 20 of 26-byte long. By stepwise varying sections to extract the sectional data in the original data 20, the encryption key generation unit 52 generates a plurality of different encryption keys 22A to 22K. For example, the encryption key 22A is generated by extracting the 0th (the left end) through 15th bytes of the original data 20, and the encryption key 22B is generated by extracting the 1st through 16th bytes of the original data 20.

Specifically, the encryption key generation unit 52 includes a counter (not shown) for counting the number of times the command D1 is received from the CPU 4. In an example of the counter value of "0", the encryption key generation unit 52 defines the leading address of the original data 20 as a read start address. Thereby, sectional data of 16 bytes are read from the leading address of the original data 20 in sequence for extracting the encryption key 22A. In an example of the counter value of "1", the encryption key generation unit 52 defines the address with one byte added to the leading address of the original data 20 as a read start address. Thereby, sectional data of 16 bytes are read from the address with one byte added to the leading address of the original data 20 in sequence for extracting the encryption key 22B.

Although sections to extract each set of sectional data are shifted by one byte in the example shown in FIG. 6, they may be shifted by one bit, a plurality of bits, or a plurality of bytes, not limited to one byte. In addition, although FIG. 6 shows the example of extracting sectional data of consecutive 16 bytes to generate the encryption key 22, the present embodiment is not limited to this example and may generate the encryption key 22 of 16-byte long by extracting a plurality of inconsecutive sectional data sets and combining them. For example, the encryption key 22 of 16-byte long may be generated by extracting the first 10 bytes of the original data 20 as a first portion of the sectional data and the last 6 bytes as a second portion of the sectional data, and combining the first and second portions of the sectional data.

Since the data length of the encryption key 22 is 16 bytes in the example shown in FIG. 6, preparing 11 kinds of the encryption keys 22 in the conventional method requires storage capacity of 16*11=176 bytes to be secured in the memory cell array 7. On the other hand, the method shown in FIG. 6 requires only 16+10=26 bytes for storage capacity to be secured in the memory cell array 7, which significantly reduces the capacity.

With the same method shown in FIG. 6, the decryption key generation unit 82 shown in FIG. 3 can generate a plurality of decryption keys 22, the encryption key generation unit 92 shown in FIG. 4 can generate a plurality of encryption keys 32, and the decryption key generation unit 62 shown in FIG. 5 can generate a plurality of decryption keys 32.

FIGS. 7 and 8 are diagrams illustrating a second example of a method for modifying the original data 20 for generating the encryption key 22 by the encryption key generation unit 52 shown in FIG. 2. In the examples shown in FIGS. 7 and 8, the original data 20 has the total of 8 bytes of 0th byte, K0, through 7th byte, K7. The data length of the encryption key 22 is also 8 bytes.

The encryption key generation unit 52 generates the encryption key 22 by sectioning a bit sequence of the original data 20 per byte and rearranging the arrangement sequence of the sectioned bytes (i.e. shuffling).

According to the example shown in FIG. 7, the encryption key generation unit 52 generates a plurality of different encryption keys 22A to 22H, by shifting the bit sequence of the original data 20 to the left by one byte. A byte overflowed from the left end by shifting to the left is moved to the right end. For example, the encryption key 22A is configured with bytes K0, K1, K2, K3, K4, K5, K6 and K7 in this order, and the encryption key 22B is configured with bytes K1, K2, K3, K4, K5, K6, K7 and K0 in this order.

Specifically, the encryption key generation unit 52 includes a counter (not shown) for counting the number of times the command D1 is received from the CPU 4. In an example of the counter value of "0", the encryption key 22A is generated by reading the original data 20 from the leading address (byte K0) in sequence. In an example of the counter value of "1", the encryption key generation unit 52 defines the address with one byte added to the leading address of the original data 20 as a read start address. Thereby, the original data 20 is read from the address (K1) with one byte added to the leading address of the original data 20 in sequence. If the data length of the encryption key 22 is shorter than 8 bytes after reading the last address of the original data 20, the encryption key generation unit 52 goes back to the leading address of the original data 20, and continues to read until the data length becomes 8 bytes. The encryption key 22B is thus generated.

According to the example shown in FIG. 8, the encryption key generation unit 52 generates a plurality of different encryption keys 22A to 22D, by rearranging each byte of the bit sequence of the original data 20 randomly.

Although the bit sequence of the original data 20 is sectioned per byte for shuffling in the examples shown in FIGS. 7 and 8, it may be sectioned per bit, plurality of bits, or plurality of bytes, not limited to per byte.

Since the data length of the encryption key 22 is 8 bytes in the examples shown in FIGS. 7 and 8, preparing X kinds (X is a natural number not less than 2) of the encryption keys 22 in the conventional method requires storage capacity of 8*X bytes to be secured in the memory cell array 7. On the other hand, the methods shown in FIGS. 7 and 8 require only 8 bytes of the original data 20 for storage capacity to be secured in the memory cell array 7, which significantly reduces the capacity.

With the same method shown in FIGS. 7 and 8, the decryption key generation unit 82 shown in FIG. 3 can generate the plurality of decryption keys 22, the encryption key generation unit 92 shown in FIG. 4 can generate the plurality of encryption keys 32, and the decryption key generation unit 62 shown in FIG. 5 can generate the plurality of decryption keys 32.

FIG. 9 is a diagram illustrating a third example of a method for modifying the original data 20 for generating the encryption key 22 by the encryption key generation unit 52 shown in FIG. 2. In the example shown in FIG. 9, the original data 20 has the total of 8 bytes of 0th byte K0 through 7th byte K7. The data length of the encryption key 22 is also 8 bytes.

The encryption key generation unit 52 generates the encryption key 22 by replacing a section or the whole of a bit sequence of the original data 20 with a bit sequence of a specific section of the original data 20 (i.e. copying).

An encryption key 22A is generated by replacing all bytes from the 0th byte K0 through the 7th byte K7 of the original data 20 with the 0th byte K0 of the original data 20. Specifically, when the 0th byte K0 of the encryption key 22A is generated, the 0th byte K0 of the original data 20 is read by directly using the read address. When the 1st byte K1, for example, of the encryption key 22A is generated, the 0th byte K0 of the original data 20 is read by using the address obtained by subtracting 1 byte from the read address. Similarly, when the 2nd byte K2, for example, of the encryption key 22A is generated, the 0th byte K0 of the original data 20 is read by using the address obtained by subtracting 2 bytes from the read address. By performing the same address conversion for the 3rd byte K3 through 7th byte K7 of the encryption key 22A, all bytes of the encryption key 22A become the 0th byte K0 of the original data 20.

Similarly, an encryption key 22B is generated by replacing all bytes from the 0th byte K0 through the 7th byte K7 of the original data 20 with the 2nd byte K2 of the original data 20.

An encryption key 22C is generated by replacing the 0th byte K0 through the 3rd byte K3 of the original data 20 with the 1st byte K1 of the original data 20 and replacing the 4th byte K4 through the 7th byte K7 of the original data 20 with the 4th byte K4 of the original data 20. Similarly, an encryption key 22D is generated by replacing the 0th byte K0 through the 3rd byte K3 of the original data 20 with the 3rd byte K3 of the original data 20 and replacing the 4th byte K4 through the 7th byte K7 of the original data 20 with the 6th byte K6 of the original data 20.

An encryption key 22E is generated by replacing the 0th byte K0 and the 1st byte K1 of the original data 20 with the 0th byte K0 of the original data 20, replacing the 2nd byte K2 and the 3rd byte K3 of the original data 20 with the 2nd byte K2 of the original data 20, replacing the 4th byte K4 and the 5th byte K5 of the original data 20 with the 4th byte K4 of the original data 20, and replacing the 6th byte K6 and the 7th byte K7 of the original data 20 with the 6th byte K6 of the original data 20. Similarly, an encryption key 22F is generated by replacing the 0th byte K0 and the 1st byte K1 of the original data 20 with the 1st byte K1 of the original data 20, replacing the 2nd byte K2 and the 3rd byte K3 of the original data 20 with the 3rd byte K3 of the original data 20, replacing the 4th byte K4 and the 5th byte K5 of the original data 20 with the 5th byte K5 of the original data 20, and replacing the 6th byte K6 and the 7th byte K7 of the original data 20 with the 7th byte K7 of the original data 20.

Although the bit sequence of the original data 20 is sectioned per byte for replacing in the examples shown in FIG. 9, it may be sectioned per bit, plurality of bits, or plurality of bytes, not limited to per byte.

Since the data length of the encryption key 22 is 8 bytes in the examples shown in FIG. 9, preparing X kinds of the encryption keys 22 in the conventional method requires storage capacity of 8*X bytes to be secured in the memory cell array 7. On the other hand, the method shown in FIG. 9 requires only 8 bytes of the original data 20 for storage capacity to be secured in the memory cell array 7, which significantly reduces the capacity.

With the same method shown in FIG. 9, the decryption key generation unit 82 shown in FIG. 3 can generate the plurality of decryption keys 22, the encryption key generation unit 92 shown in FIG. 4 can generate the plurality of encryption keys 32, and the decryption key generation unit 62 shown in FIG. 5 can generate the plurality of decryption keys 32.

FIG. 10 is a diagram illustrating a fourth example of a method for modifying the original data 20 for generating the encryption key 22 by the encryption key generation unit 52 shown in FIG. 2. In the example shown in FIG. 10, the original data 20 has the total of 8 bytes of 0th byte K0 through 7th byte K7. The data D5 also has the total of 8 bytes of 0th byte L0 through 7th byte L7. The data length of the encryption key 22 is also 8 bytes. The data D5 is the data transmitted to the host computer 2 from the semiconductor memory 3 by a previous process, such as the former reading process (see FIG. 1).

The encryption key generation unit 52 generates the encryption key 22 to be used in the present process in the processing unit 9, by performing a predetermined operation on the original data 20, using the data D5 previously processed by the processing unit 9 shown in FIG. 1.

Referring to FIG. 10, an encryption key 22A is generated by performing an exclusive OR operation between each of the bytes K0 to K7 of the original data 20 and each of the bytes L0 to L7 of the data D5, and arranging each result of the operation of the bytes in sequence, as bytes M0 to M7.

An encryption key 22B is generated by performing an exclusive OR operation between the 0th byte K0 of the original data 20 and the 0th byte L0 of the data D5 to define the result as the 0th byte M0, and using the 1st byte K1 to the 7th byte K7 of the original data 20 for the remaining 1st to 7th bytes.

An encryption key 22C is generated by performing an exclusive OR operation between the 1st byte K1 of the original data 20 and the 1st byte L1 of the data D5 to define the result as the 1st byte M1, and using the 0th byte K0 and the 2nd byte K2 to the 7th byte K7 of the original data 20 for the remaining 0th and 2nd to 7th bytes.

An encryption key 22D is generated by performing an OR operation between each of the bytes K0 to K7 of the original data 20 and each of the bytes L0 to L7 of the data D5, and arranging each result of the operation of the bytes in sequence, as bytes N0 to N7.

An encryption key 22E is generated by performing an OR operation between the 0th byte K0 of the original data 20 and the 0th byte L0 of the data D5 to define the result as the 0th byte N0, and using the 1st byte K1 to the 7th byte K7 of the original data 20 for the remaining 1st to 7th bytes.

Although the bit sequence of the original data 20 is sectioned per byte for the operation in the example shown in FIG. 10, it may be per bit, plurality of bits, or plurality of bytes. In addition, although the operation is performed using the previously processed data D5, the previously processed command D2 may be used for the operation. Still in addition, instead of using the data D5 or the command D2 which have been previously processed, a pseudo random number may be generated by a pseudo random number generation circuit in the present process to perform an operation between a bit string of the generated pseudo random number and the original data 20.

Since the data length of the encryption key 22 is 8 bytes in the examples shown in FIG. 10, preparing X kinds of the encryption keys 22 in the conventional method requires storage capacity of 8*X bytes to be secured in the memory cell array 7. On the other hand, the method shown in FIG. 10 requires only 8 bytes of the original data 20 for storage capacity to be secured in the memory cell array 7, which significantly reduces the capacity.

With the same method shown in FIG. 10, the decryption key generation unit 82 shown in FIG. 3 can generate the plurality of decryption keys 22, the encryption key generation unit 92 shown in FIG. 4 can generate the plurality of encryption keys 32, and the decryption key generation unit 62 shown in FIG. 5 can generate the plurality of decryption keys 32.

In the signal processor 1 according to the first preferred embodiment, the original data 20 and 30 to be sources for the encryption keys 22 and 32 are stored in the memory cell array 7, and the encryption key generation units 52 and 92 variously modify the original data 20 and 30 read from the memory cell array 7 to generate pluralities of encryption keys 22 and 32, respectively. Then, the encryption units 53 and 93 use the encryption keys 22 and 32, each key being different for each command D1 and each set of the data D4, to encrypt each command D1 and each set of the data D4. Consequently, since there is no need to store the pluralities of encryption keys 22 and 32 in the memory cell array 7, it is possible to process the pluralities of encryption keys 22 and 32 while minimizing addition of a resource, and security is thus improved.

Similarly, in the signal processor 1 according to the first preferred embodiment, the original data 20 and 30 to be sources for the decryption keys 22 and 32 are stored in the memory cell array 7, and the decryption key generation units 62 and 82 variously modify the original data 20 and 30 read from the memory cell array 7 to generate pluralities of decryption keys 22 and 32, respectively. Then, the decryption units 63 and 83 use the decryption keys 22 and 32, each key being different for each command D2 and each set of the data D5, to decrypt the encrypted command D2 and data D5. Consequently, since there is no need to store the pluralities of decryption keys 22 and 32 in the memory cell array 7, it is possible to process the pluralities of decryption keys 22 and 32 while minimizing addition of a resource, and security is thus improved.

Second Preferred Embodiment

Figure 11:
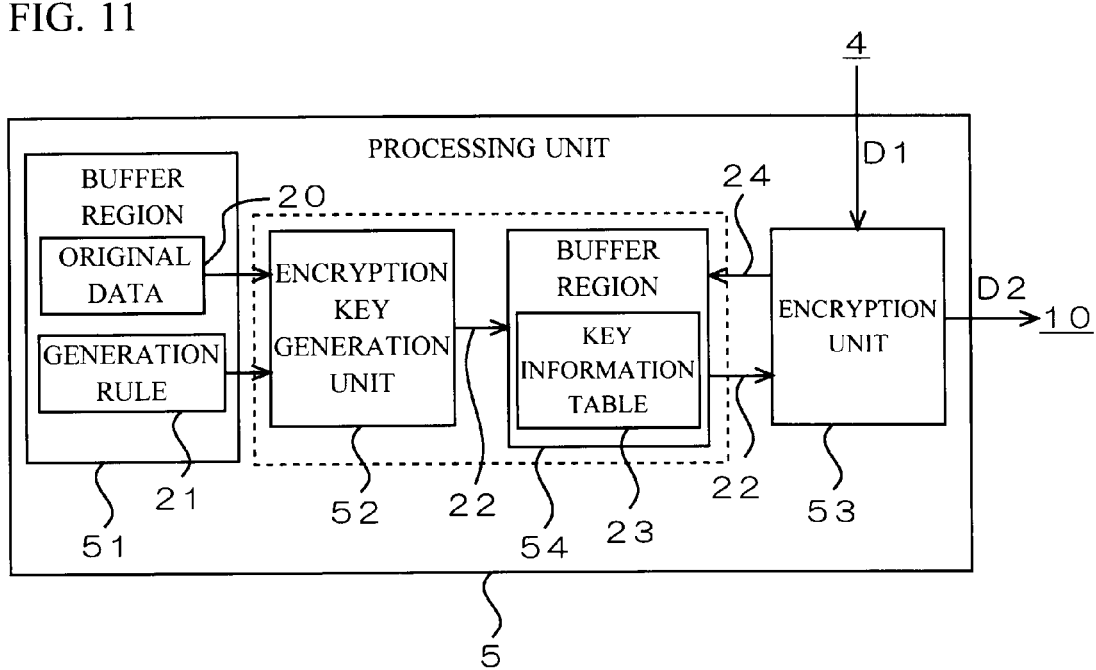
FIG. 11 is a block diagram showing a configuration of a processing unit shown in FIG. 1 of the signal processor according to a second preferred embodiment of the present invention.

FIG. 11 is a block diagram showing a configuration of a processing unit 5 shown in FIG. 1 of the signal processor 1 according to a second preferred embodiment of the present invention. The processing unit 5 includes a buffer region 54 which is referred to by an encryption unit 53, in addition to the buffer region 51, encryption key generation unit 52, and encryption unit 53, which are the elements same as those in the first preferred embodiment shown in FIG. 2.

Immediately after the signal processor 1 is turned on, the encryption key generation unit 52 reads original data 20 and a generation rule 21 from the buffer region 51, and modifies the original data 20 variously based on the generation rule 21 to generate a plurality of encryption keys 22. The method for generating the encryption keys 22 is the same as in the description for the first preferred embodiment. After that, the encryption key generation unit 52 produces a key information table 23 described below based on the plurality of generated encryption keys 22, and stores the key information table 23 in the buffer region 54.

Figure 12:
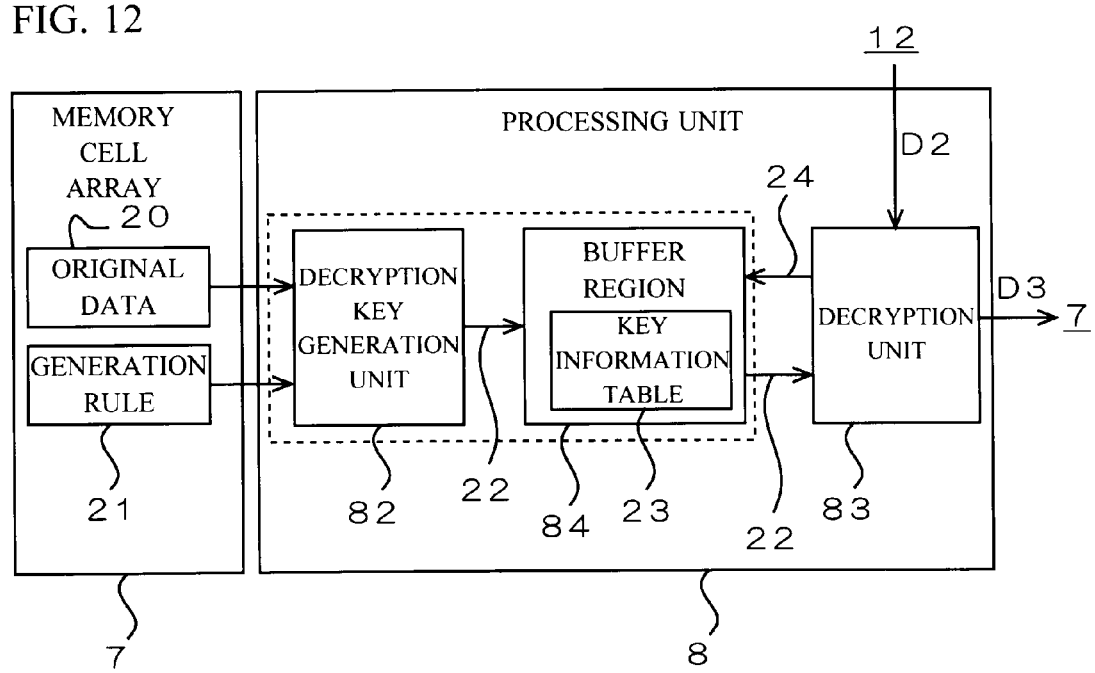
FIG. 12 is a block diagram showing a configuration of a processing unit and a memory cell array shown in FIG. 1 of the signal processor according to the second preferred embodiment of the present invention.

FIG. 12 is a block diagram showing a configuration of a processing unit 8 and a memory cell array 7 shown in FIG. 1 of the signal processor 1 according to the second preferred embodiment. The memory cell array 7 shown in FIG. 12 is the same as the memory cell array 7 according to the first embodiment shown in FIG. 3. The processing unit 8 includes a buffer region 84 which is referred to by a decryption unit 83, in addition to the decryption key generation unit 82 and decryption unit 83, which are the elements same as those in the first preferred embodiment shown in FIG. 3.

Immediately after the signal processor 1 is turned on, the decryption key generation unit 82 reads the original data 20 and the generation rule 21 from the memory cell array 7, and modifies the original data 20 variously based on the generation rule 21 to generate a plurality of decryption keys 22. The method for generating the plurality of decryption keys 22 is the same as in the description for the first preferred embodiment. After that, the decryption key generation unit 82 produces the key information table 23 described below based on the plurality of generated decryption keys 22, and stores the key information table 23 in the buffer region 84.

FIG. 13 is a diagram showing the key information table 23. A plurality of key information items A0 to An is described in the key information table 23. The key information items A0 to An function as encryption keys in the key information table 23 generated by the encryption key generation unit 52, and decryption keys in the key information table 23 generated by the decryption key generation unit 82. The key information items A0 to An are sectioned and arranged with each key information item based on a respective index value.

Referring to FIG. 11, the encryption unit 53 designates an index value of the key information table 23 by a parameter 24. The encryption key 22 corresponding to the designated index value is read from the key information table 23 and inputted to the encryption unit 53. By using a different parameter 24 for each command D1, encryption can be performed with a different encryption key 22 for each command D1.

Referring to FIG. 12, the decryption unit 83 designates an index value of the key information table 23 by a parameter 24. The decryption key 22 corresponding to the designated index value is read from the key information table 23 and inputted to the decryption unit 83. By using a different parameter 24 for each command D2, decryption can be performed with a different decryption key 22 for each command D2.

Figure 14:
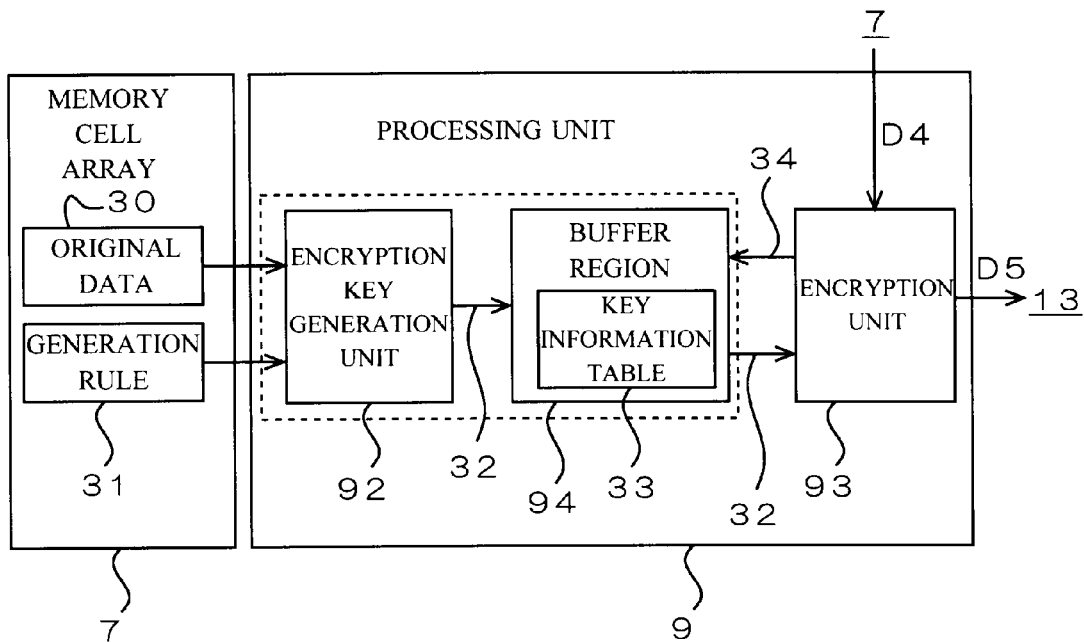
FIG. 14 is a block diagram showing a configuration of a processing unit and a memory cell array shown in FIG. 1 of the signal processor according to the second preferred embodiment of the present invention.

FIG. 14 is a block diagram showing a configuration of a processing unit 9 and the memory cell array 7 shown in FIG. 1 of the signal processor 1 according to the second preferred embodiment. The memory cell array 7 shown in FIG. 14 is the same as the memory cell array 7 according to the first embodiment shown in FIG. 4. The processing unit 9 includes a buffer region 94 which is referred to by an encryption unit 93, in addition to the encryption key generation unit 92 and encryption unit 93, which are the elements same as those in the first preferred embodiment shown in FIG. 4.

Immediately after the signal processor 1 is turned on, the encryption key generation unit 92 reads original data 30 and generation rule 31 from the memory cell array 7, and modifies the original data 30 variously based on the generation rule 31 to generate a plurality of encryption keys 32. The method for generating the encryption key 32 is the same as in the description for the first preferred embodiment. After that, the encryption key generation unit 92 produces a key information table 33 described below based on the plurality of generated encryption keys 32, and stores the key information table 33 in the buffer region 94.

Figure 15:
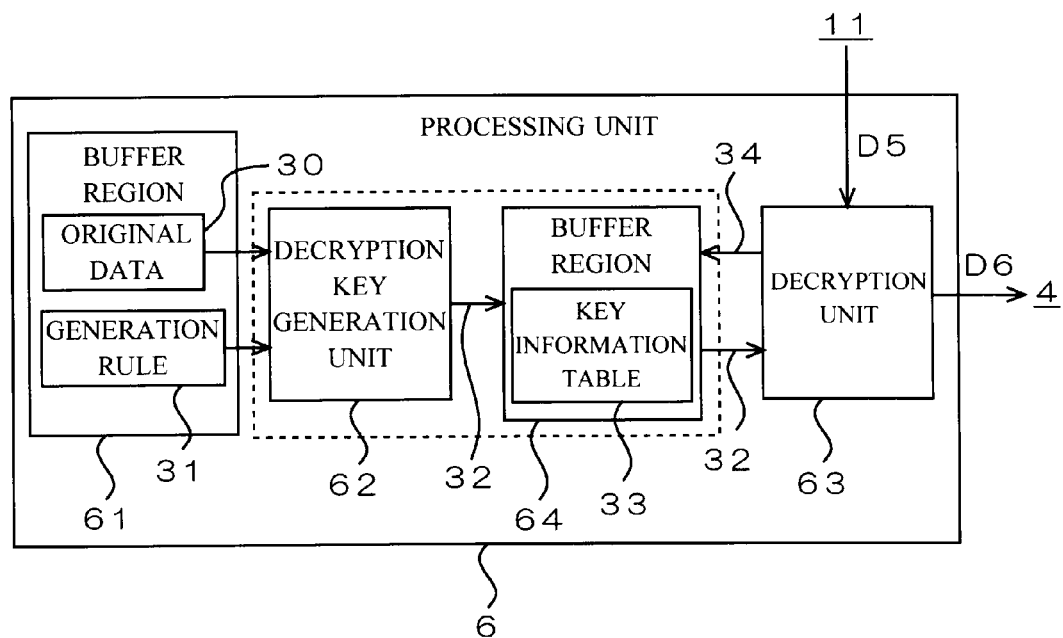
FIG. 15 is a block diagram showing a configuration of a processing unit shown in FIG. 1 of the signal processor according to the second preferred embodiment of the present invention.

FIG. 15 is a block diagram showing a configuration of a processing unit 6 shown in FIG. 1 of the signal processor 1 according to the second preferred embodiment. The processing unit 6 includes a buffer region 64 which is referred to by a decryption unit 63, in addition to the buffer region 61, decryption key generation unit 62, and decryption unit 63, which are the elements same as those in the first preferred embodiment shown in FIG. 5.

Immediately after the signal processor 1 is turned on, the decryption key generation unit 62 reads the original data 30 and the generation rule 31 from the buffer region 61, and modifies the original data 30 variously based on the generation rule 31 to generate a plurality of decryption keys 32. The method for generating the decryption keys 32 is the same as in the description for the first preferred embodiment. After that, the decryption key generation unit 62 produces a key information table 33 described below based on the plurality of generated decryption keys 32, and stores the key information table 33 in the buffer region 64.

FIG. 16 is a diagram showing the key information table 33. A plurality of key information items B0 to Bn is described in the key information table 33. The key information items B0 to Bn function as encryption keys in the key information table 33 generated by the encryption key generation unit 92, and decryption keys in the key information table 33 generated by the decryption key generation unit 62. The key information items B0 to Bn are sectioned and arranged by each key information item based on a respective index value.

Referring to FIG. 14, the encryption unit 93 designates an index value of the key information table 33 by a parameter 34. The encryption key 32 corresponding to the designated index value is read from the key information table 33 and inputted to the encryption unit 93. By using a different parameter 34 for each set of the data D4, encryption can be performed with a different encryption key 32 for each set of the data D4.

Referring to FIG. 15, the decryption unit 63 designates an index value of the key information table 33 by a parameter 34. The decryption key 32 corresponding to the designated index value is read from the key information table 33 and inputted to the decryption unit 63. By using a different parameter 34 for each set of the data D5, decryption can be performed with a different decryption key 32 for each set of the data D5.

The signal processor 1 according to the second preferred embodiment achieves the following effects, in addition to the same effects as the first preferred embodiment. The encryption key generation unit 52 and the decryption key generation unit 82 produce the key information table 23 in which the plurality of the key information items A0 to An is described and store the key information table 23 in the buffer regions 54 and 84. Consequently, the commands D1 and D2 to be processed are updated, and changing the encryption key 22 and the decryption key 22 requires only selecting another encryption key 22 and another decryption key 22 from the key information table 23. Since there is no need to newly generate an encryption key 22 and a decryption key 22, processing speed is enhanced.

Similarly, the encryption key generation unit 92 and the decryption key generation unit 62 produce the key information table 33 in which the plurality of key information items B0 to Bn is described and store the key information table 33 in the buffer regions 64 and 94. Consequently, the data D4 and D5 to be processed are updated, and changing the encryption key 32 and the decryption key 32 requires only selecting another encryption key 32 and another decryption key 32 from the key information table 33. Since there is no need to newly generate an encryption key 32 and a decryption key 32, processing speed is enhanced.

Figure 17:
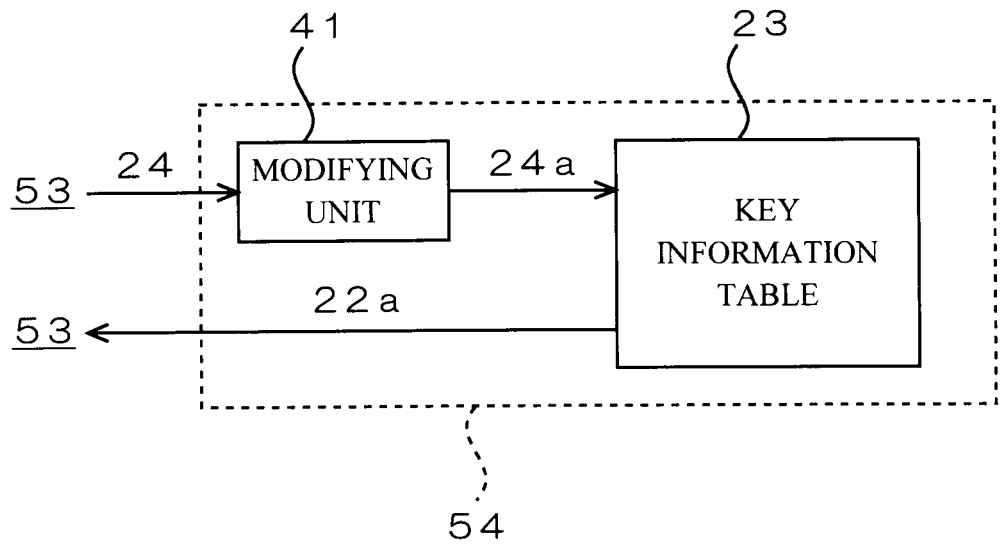
FIG. 17 is a block diagram showing a modification of the processing unit shown in FIG. 11 of the signal processor according to the second preferred embodiment of the present invention.

FIG. 17 is a block diagram showing a modification of the processing unit 5 shown in FIG. 11. FIG. 17 shows only a part of the configuration of the processing unit 5. In the example shown in FIG. 11, the parameter 24 outputted from the encryption unit 53 is directly (i.e. without modification) inputted to the key information table 23. In contrast, in the modification shown in FIG. 17, the parameter 24 outputted from the encryption unit 53 is inputted to a modifying unit 41 and is changed to another parameter 24a by the modifying unit 41. Then, the parameter 24a outputted from the modifying unit 41 is inputted to the key information table 23, and an encryption key 22a corresponding to an index value designated by the parameter 24a is read from the key information table 23 and inputted to the encryption unit 53.

Figure 18:
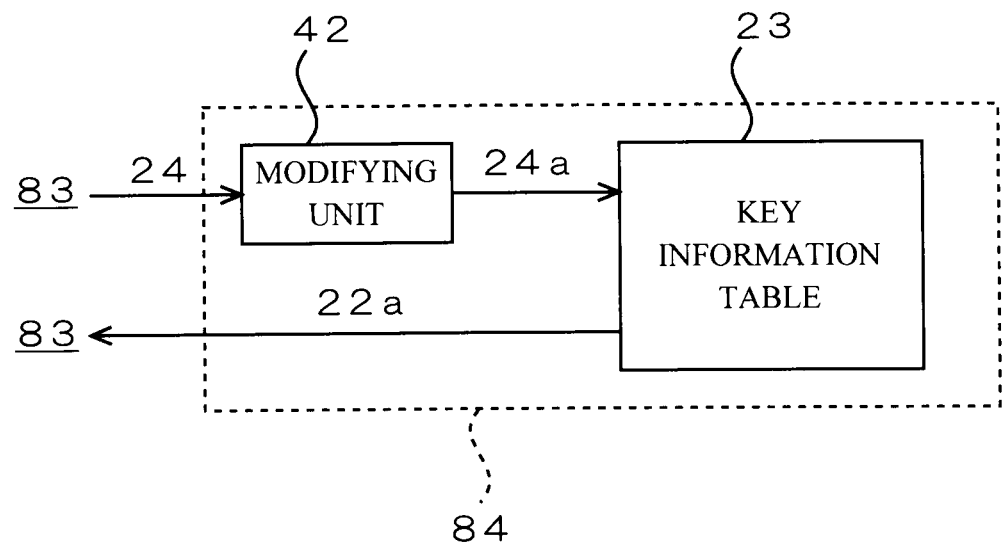
FIG. 18 is a block diagram showing a modification of the processing unit shown in FIG. 12 of the signal processor according to the second preferred embodiment of the present invention.

FIG. 18 is a block diagram showing a modification of the processing unit 8 shown in FIG. 12. FIG. 18 shows only a part of the configuration of the processing unit 8. In the example shown in FIG. 12, the parameter 24 outputted from the decryption unit 83 is directly (i.e. without modification) inputted to the key information table 23. In contrast, in the modification shown in FIG. 18, the parameter 24 outputted from the decryption unit 83 is inputted to a modifying unit 42 and is changed to another parameter 24a by the modifying unit 42. Then, the parameter 24a outputted from the modifying unit 42 is inputted to the key information table 23, and a decryption key 22a corresponding to an index value designated by the parameter 24a is read from the key information table 23 and inputted to the decryption unit 83.

Figure 19:
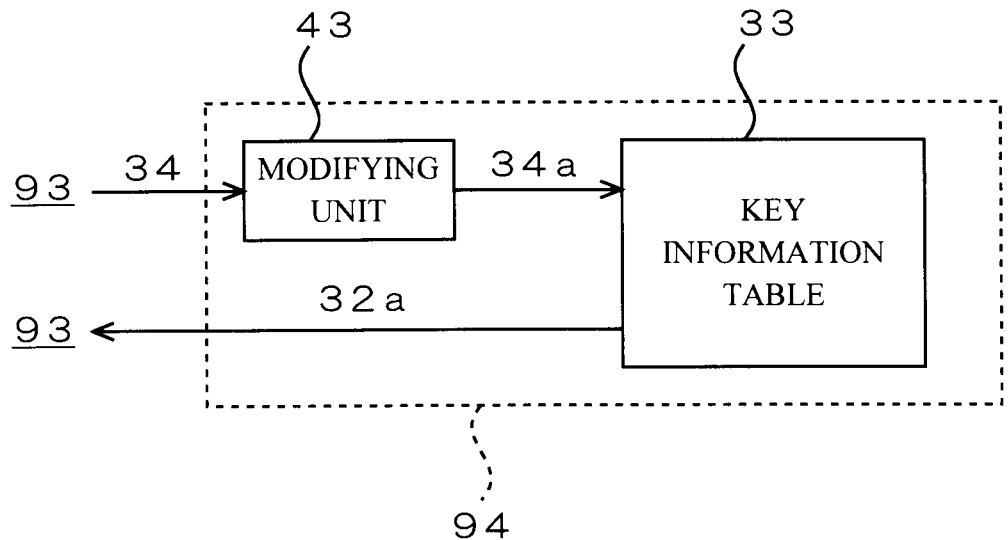
FIG. 19 is a block diagram showing a modification of the processing unit shown in FIG. 14 of the signal processor according to the second preferred embodiment of the present invention.

FIG. 19 is a block diagram showing a modification of the processing unit 9 shown in FIG. 14. FIG. 19 shows only a part of the configuration of the processing unit 9. In the example shown in FIG. 14, the parameter 34 outputted from the encryption unit 93 is directly (i.e. without modification) inputted to the key information table 33. In contrast, in the modification shown in FIG. 19, the parameter 34 outputted from the encryption unit 93 is inputted to a modifying unit 43 and is changed to another parameter 34a by the modifying unit 43. Then, the parameter 34a outputted from the modifying unit 43 is inputted to the key information table 33, and an encryption key 32a corresponding to an index value designated by the parameter 34a is read from the key information table 33 and inputted to the encryption unit 93.

Figure 20:
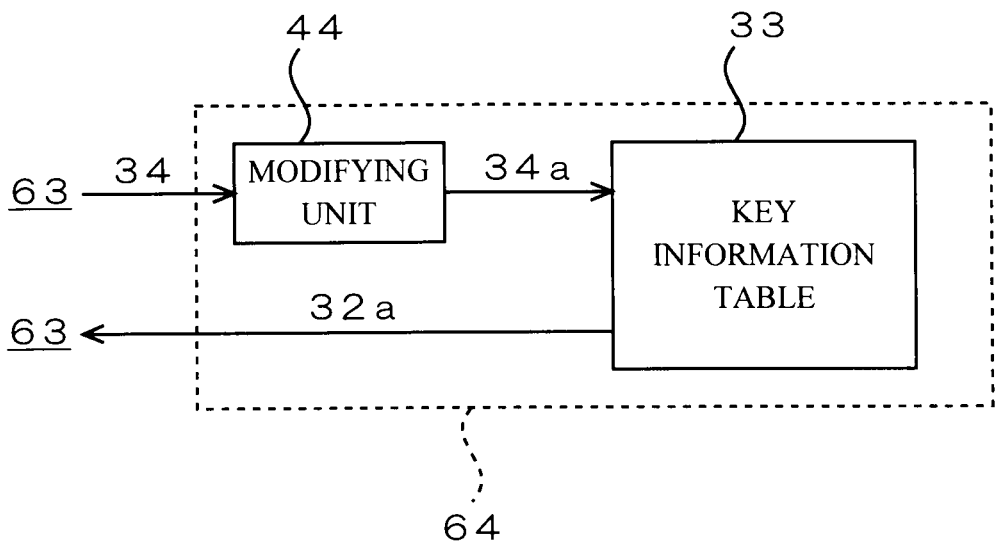
FIG. 20 is a block diagram showing a modification of the processing unit shown in FIG. 15 of the signal processor according to the second preferred embodiment of the present invention.

FIG. 20 is a block diagram showing a modification of the processing unit 6 shown in FIG. 15. FIG. 20 shows only a part of the configuration of the processing unit 6. In the example shown in FIG. 15, the parameter 34 outputted from the decryption unit 63 is directly (i.e. without modification) inputted to the key information table 33. In contrast, in the modification shown in FIG. 20, the parameter 34 outputted from the decryption unit 63 is inputted to a modifying unit 44 and is changed to another parameter 34a by the modifying unit 44. Then, the parameter 34a outputted from the modifying unit 44 is inputted to the key information table 33, and a decryption key 32a corresponding to an index value designated by the parameter 34a is read from the key information table 33 and inputted to the decryption unit 63.

A method of modifying the parameters 24 and 34 by the modifying units 41 to 44 may be an arbitrary method such as shifting, shuffling, copying, or performing an operation, as shown in FIGS. 6 to 10.

In the signal processor 1 according to the modifications of the second preferred embodiment, the modifying unit 41 modifies the parameter 24 inputted from the encryption unit 53 to change the parameter 24 to another parameter 24a. Consequently, even if the parameter 24 outputted from the encryption unit 53 leaks and gets cracked by a third party, the parameter 24 is changed to another parameter 24a by the modifying unit 41, and security is thus improved. The same effect is achieved also by the other modifying units 42 to 44.

In the illustration above, the key information table 23 is produced by the encryption key generation unit 52 and the decryption key generation unit 82 based on the original data 20 and the generation rule 21, and the key information table 33 is produced by the encryption key generation unit 92 and the decryption key generation unit 62 based on the original data 30 and the generation rule 31. The examples of changing parameters by the modifying units 41 to 44 are intended for the key information tables 23 and 33 thus produced. The signal processor 1 according to the modifications of the second preferred embodiment, however, is applicable not only to the examples but also to other modifications as below.

Figure 21:
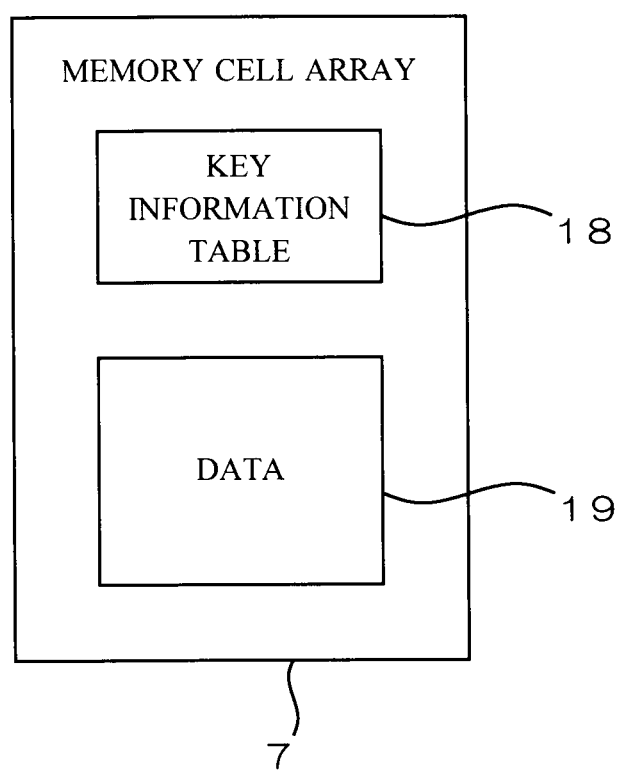
FIG. 21 is a block diagram showing a modification of the memory cell array of the signal processor according to the second preferred embodiment of the present invention.

FIG. 21 is a block diagram showing a modification of the memory cell array 7. Data 19, which is equivalent to the data D4 in FIG. 1, is stored in the memory cell array 7 shown in FIG. 21. Instead of the original data 20 and 30 and the generation rules 21 and 31, a key information table 18 is stored in the memory cell array 7 shown in FIG. 21. In other words, according to the modification shown in FIG. 21, instead of producing the key information tables 23 and 33 based on the original data 20 and 30 and the generation rules 21 and 31, the key information table 18 in which a plurality of key information items is described is produced in advance and stored in the memory cell array 7.

The modifying units 41 to 44 can change a parameter as above on the key information table 18 stored in advance in the memory cell array 7 as shown in FIG. 21, and achieve the same effects.

Third Preferred Embodiment

As a third preferred embodiment of the present invention, a modification of the first and second preferred embodiments is illustrated below.

Figure 22:
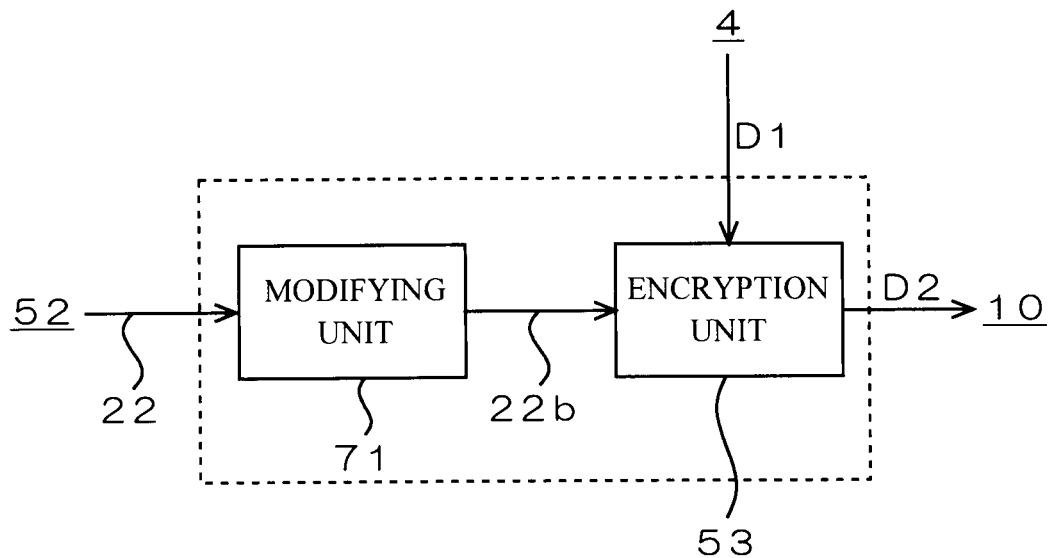
FIG. 22 is a block diagram showing a modification of the processing unit shown in FIGS. 2 and 11 of the signal processor according to a third preferred embodiment of the present invention.

FIG. 22 is a block diagram showing a modification of the processing unit 5 shown in FIGS. 2 and 11. FIG. 22 shows only a part of the configuration of the processing unit 5. In the example shown in FIG. 2, the encryption key 22 outputted from the encryption key generation unit 52 is directly (i.e. without modification) inputted to the encryption unit 53. Similarly, in the example shown in FIG. 11, the encryption key 22 outputted from the buffer region 54 is directly (i.e. without modification) inputted to the encryption unit 53. In contrast, in the modification shown in FIG. 22, the encryption key 22 outputted from the encryption key generation unit 52 (or the buffer region 54) is inputted to a modifying unit 71 and is changed to another encryption key 22b by the modifying unit 71. Then, the encryption key 22b outputted from the modifying unit 71 is inputted to the encryption unit 53, and the encryption unit 53 encrypts the command D1 with the inputted encryption key 22b.

Figure 23:
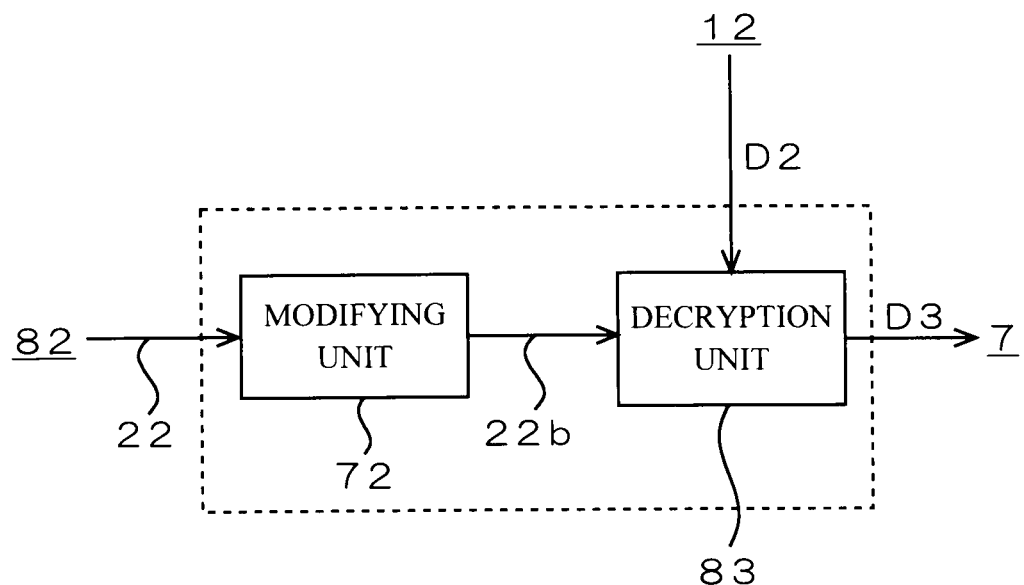
FIG. 23 is a block diagram showing a modification of the processing unit shown in FIGS. 3 and 12 of the signal processor according to the third preferred embodiment of the present invention.

FIG. 23 is a block diagram showing a modification of the processing unit 8 shown in FIGS. 3 and 12. FIG. 23 shows only a part of the configuration of the processing unit 8. In the example shown in FIG. 3, the decryption key 22 outputted from the decryption key generation unit 82 is directly (i.e. without modification) inputted to the decryption unit 83. Similarly, in the example shown in FIG. 12, the decryption key 22 outputted from the buffer region 84 is directly (i.e. without modification) inputted to the decryption unit 83. In contrast, in the modification shown in FIG. 23, the decryption key 22 outputted from the decryption key generation unit 82 (or the buffer region 84) is inputted to a modifying unit 72 and is changed to another decryption key 22b by the modifying unit 72. Then, the decryption key 22b outputted from the modifying unit 72 is inputted to the decryption unit 83, and the decryption unit 83 decrypts the command D2 with the inputted decryption key 22b.

Figure 24:
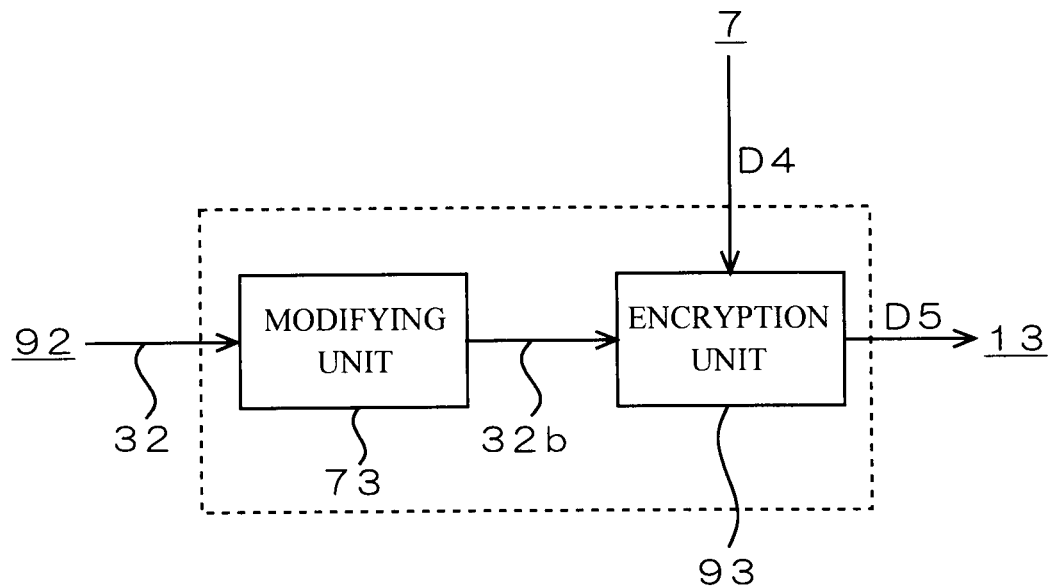
FIG. 24 is a block diagram showing a modification of the processing unit shown in FIGS. 4 and 14 of the signal processor according to the third preferred embodiment of the present invention.

FIG. 24 is a block diagram showing a modification of the processing unit 9 shown in FIGS. 4 and 14. FIG. 24 shows only a part of the configuration of the processing unit 9. In the example shown in FIG. 4, the encryption key 32 outputted from the encryption key generation unit 92 is directly (i.e. without modification) inputted to the encryption unit 93. Similarly, in the example shown in FIG. 14, the encryption key 32 outputted from the buffer region 94 is directly (i.e. without modification) inputted to the encryption unit 93. In contrast, in the modification shown in FIG. 24, the encryption key 32 outputted from the encryption key generation unit 92 (or the buffer region 94) is inputted to a modifying unit 73 and is changed to another encryption key 32b by the modifying unit 73. Then, the encryption key 32b outputted from the modifying unit 73 is inputted to the encryption unit 93, and the encryption unit 93 encrypts the data D4 with the inputted encryption key 32b.

Figure 25:
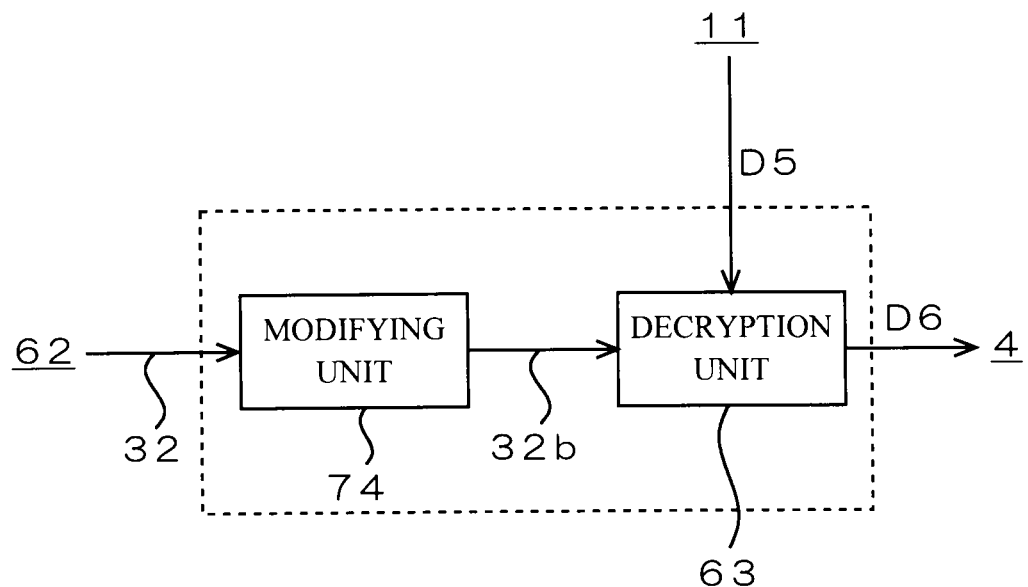
FIG. 25 is a block diagram showing a modification of the processing unit shown in FIGS. 5 and 15 of the signal processor according to the third preferred embodiment of the present invention.

FIG. 25 is a block diagram showing a modification of the processing unit 6 shown in FIGS. 5 and 15. FIG. 25 shows only a part of the configuration of the processing unit 6. In the example shown in FIG. 5, the decryption key 32 outputted from the decryption key generation unit 62 is directly (i.e. without modification) inputted to the decryption unit 63. Similarly, in the example shown in FIG. 15, the decryption key 32 outputted from the buffer region 64 is directly (i.e. without modification) inputted to the decryption unit 63. In contrast, in the modification shown in FIG. 25, the decryption key 32 outputted from the decryption key generation unit 62 (or the buffer region 64) is inputted to a modifying unit 74 and is changed to another decryption key 32b by the modifying unit 74. Then, the decryption key 32b outputted from the modifying unit 74 is inputted to the decryption unit 63, and the decryption unit 63 decrypts the data D5 with the inputted decryption key 32b.

A method of modifying the encryption keys 22 and 32 and the decryption keys 22 and 32 by the modifying units 71 to 74 may be an arbitrary method such as shifting, shuffling, copying, or performing an operation, as shown in FIGS. 6 to 10.

In the signal processor 1 according to the third preferred embodiment, the modifying unit 71 modifies the encryption key 22 inputted from the encryption key generation unit 52 to change to another encryption key 22b. Consequently, even if the encryption key 22 outputted from the encryption key generation unit 52 leaks and gets cracked by a third party, the encryption key 22 is changed to another encryption key 22b by the modifying unit 71, and security is thus improved. The same effect is achieved also by the other modifying units 72 to 74.

Fourth Preferred Embodiment

As a fourth preferred embodiment of the present invention, a modification of the second preferred embodiment is illustrated below.

Figure 26:
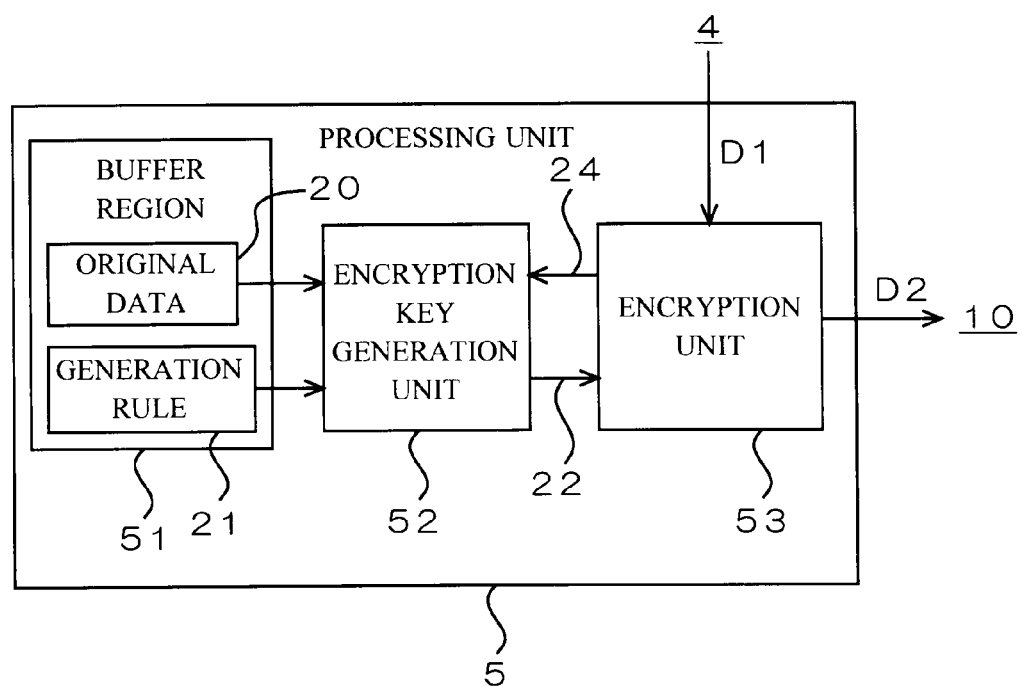
FIG. 26 is a block diagram showing a configuration of a processing unit shown in FIG. 1 of the signal processor according to a fourth preferred embodiment of the present invention.

FIG. 26 is a block diagram showing a configuration of a processing unit 5 shown in FIG. 1 of the signal processor 1 according to the fourth preferred embodiment. A buffer region 54 is omitted from the configuration shown in FIG. 11. The rest of the configuration is the same as in FIG. 11.

Figure 27:
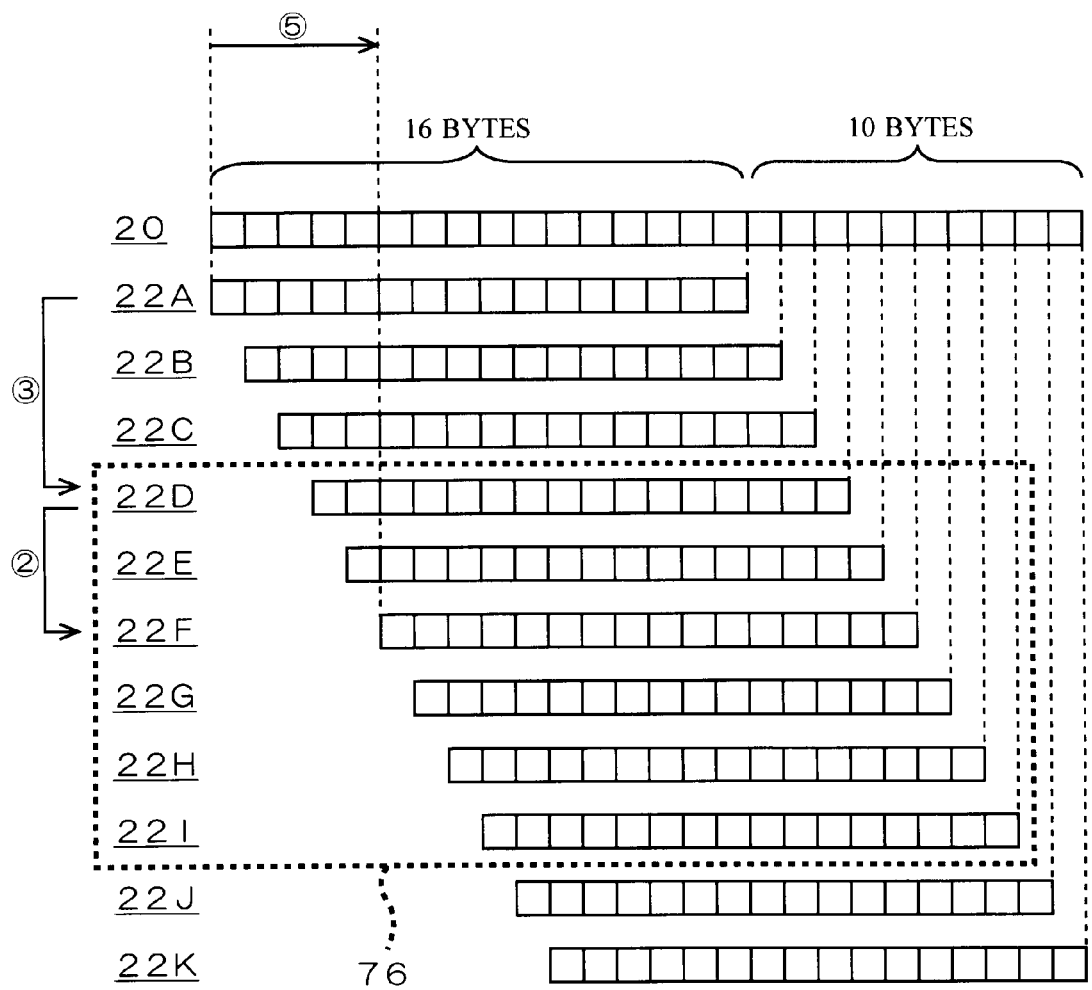
FIG. 27 is a diagram corresponding to FIG. 6 and showing a plurality of encryption keys generated by an encryption key generation unit.

FIG. 27 is a diagram corresponding to FIG. 6 and shows the plurality of encryption keys 22 generated by the encryption key generation unit 52. In the example shown in FIG. 27, an encryption key generation unit 52 is capable of generating eleven encryption keys 22A to 22K in total. In the fourth preferred embodiment, the encryption key generation unit 52 defines certain encryption keys out of the generatable encryption keys 22A to 22K as the encryption keys available for an encryption unit 53. In the example shown in FIG. 27, the six encryption keys 22D to 22I in total are defined as the encryption keys available.

The encryption key generation unit 52 holds positional information of the encryption keys 22D to 22I in the encryption keys 22A to 22K. In the example shown in FIG. 27, "3", which is the number of bytes equivalent to the difference between the leading address of the encryption key 22A and that of the encryption key 22D, is held as the positional information.

FIG. 28 is a diagram showing a virtual key information table 76. The plurality of encryption keys 22D to 22I defined as the encryption keys available is sectioned with index values and described in the key information table 76. Each index value of the key information table 76 is equivalent to the difference in the number of bytes between the leading address of the encryption key 22D and that of each of the encryption keys 22D to 22I. For example, since the difference between the leading address of the encryption key 22F and that of the encryption key 22D is 2 bytes, the index value is "2" accordingly.

Referring to FIG. 26, the encryption unit 53 inputs a parameter 24 to the encryption key generation unit 52, in order to designate an encryption key for the present process out of the encryption keys 22D to 22I. The parameter 24 is a parameter for designating the index value of the key information table 76.

Since the buffer region 54 as shown in FIG. 11 is not provided for the encryption key generation unit 52 in the fourth preferred embodiment, it is not possible to hold the key information table 76 shown in FIG. 28 in the encryption key generation unit 52. The following process is therefore performed in the fourth preferred embodiment.

Described below is an example in which the parameter 24 indicating the index value "2" is inputted to the encryption key generation unit 52 so that the encryption unit 53 designates the encryption key 22F. The encryption key generation unit 52 obtains a value "5" by adding "2" given by the parameter 24 to the positional information "3". Then, the encryption key generation unit 52 defines the address with 5 bytes added to the leading address of the original data 20 as a read start address, and reads sectional data of 16 bytes from the read start address in sequence to extract the encryption key 22F from the original data 20. The encryption key 22F thus generated is inputted from the encryption key generation unit 52 to the encryption unit 53.

Although an example of generating the plurality of encryption keys 22 by the encryption key generation unit 52 based on a method of shifting shown in FIG. 6 is described above, an arbitrary method is applicable such as shuffling, copying, or performing an operation, as shown in FIGS. 7 to 10.

In the signal processor 1 according to the fourth preferred embodiment, the encryption key generation unit 52 generates one encryption key 22F by selecting the key to be used out of the encryption keys 22D to 22I, based on the parameter 24 inputted from the encryption unit 53 and the positional information of the encryption keys 22D to 22I in the encryption keys 22A to 22K. Consequently, when compared with the signal processor 1 according to the second preferred embodiment, since it is not required to provide the encryption key generation unit 52 with the buffer region 54 for storing the key information table 23, the signal processor 1 can be simplified as a whole.

Figure 29:
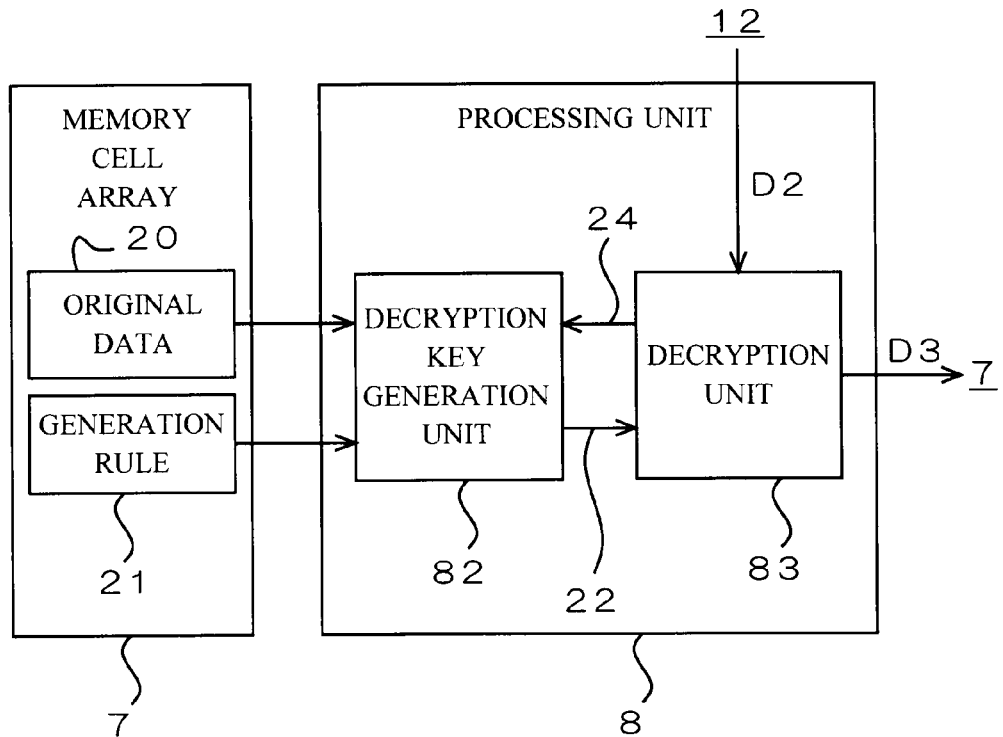
FIG. 29 is a block diagram showing a configuration of a processing unit shown in FIG. 1 of the signal processor according to the fourth preferred embodiment of the present invention.
Figure 30:
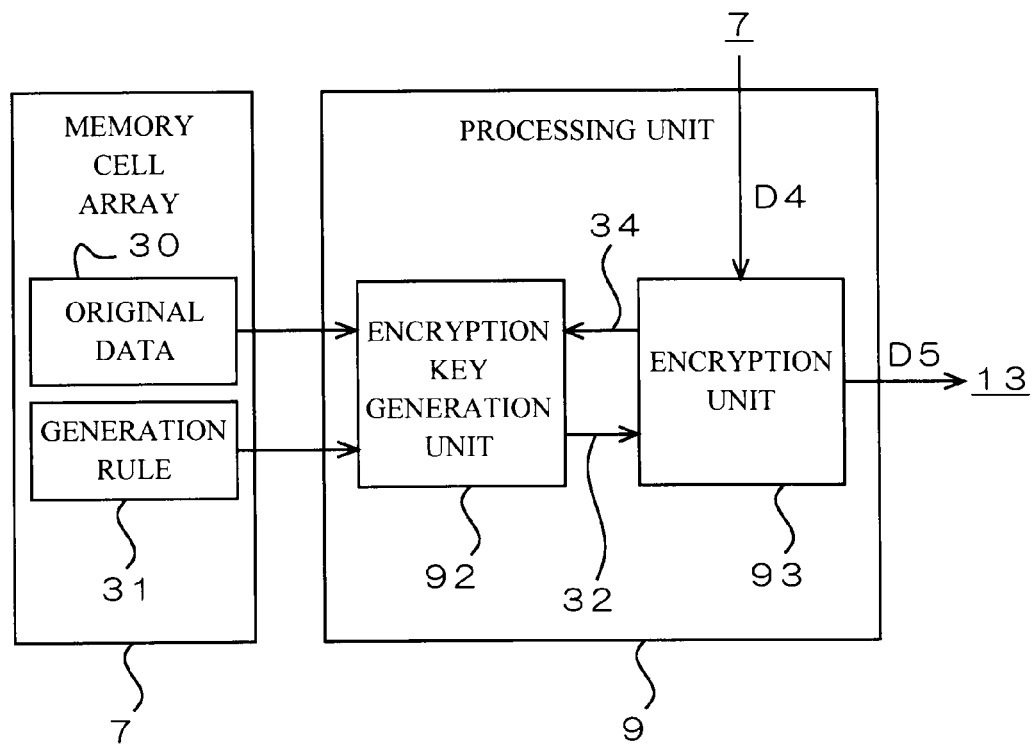
FIG. 30 is a block diagram showing a configuration of a processing unit shown in FIG. 1 of the signal processor according to the fourth preferred embodiment of the present invention.
Figure 31:
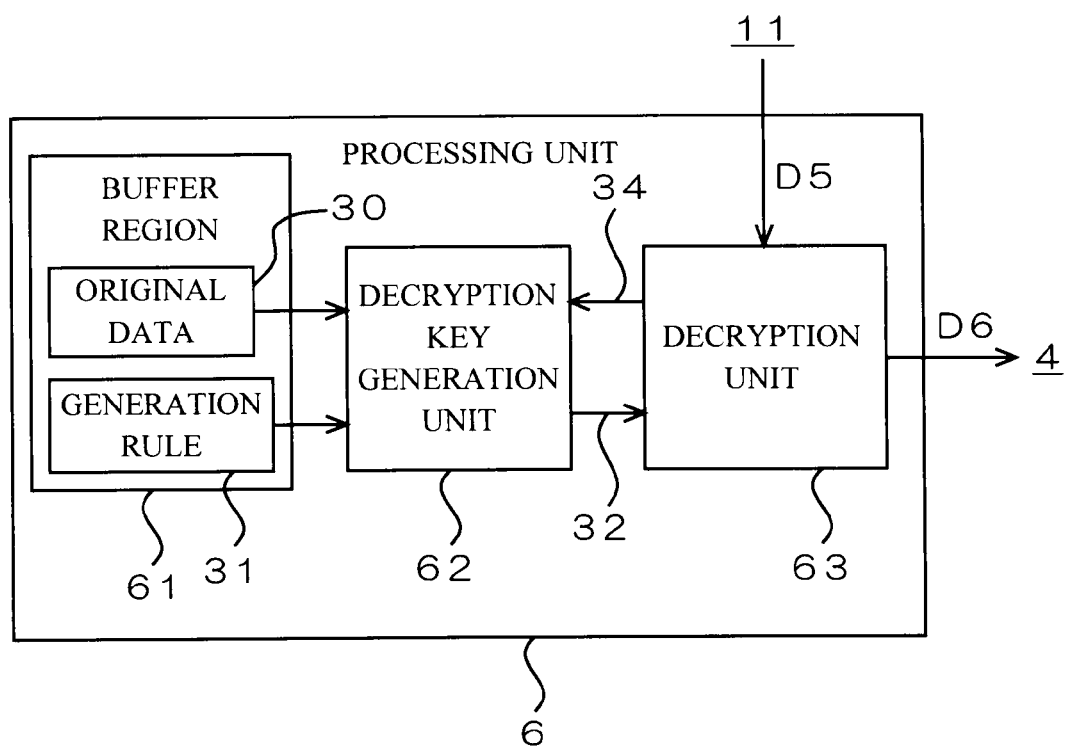
FIG. 31 is a block diagram showing a configuration of a processing unit shown in FIG. 1 of the signal processor according to the fourth preferred embodiment of the present invention.

FIGS. 29 through 31 are block diagrams respectively showing a configuration of processing units 8, 9, and 6 shown in FIG. 1 of the signal processor 1 according to the fourth preferred embodiment. With respect to the configuration in FIG. 29, a buffer region 84 is omitted from the configuration in FIG. 12 and the rest of the configuration is the same as in FIG. 12. With respect to the configuration in FIG. 30, a buffer region 94 is omitted from the configuration in FIG. 14 and the rest of the configuration is the same as in FIG. 14. With respect to the configuration in FIG. 31, a buffer region 64 is omitted from the configuration shown in FIG. 15 and the rest of the configuration is the same as in FIG. 15.

In the same manner as the encryption key generation unit 52, a decryption key generation unit 82 shown in FIG. 29 can generate a decryption key 22, an encryption key generation unit 92 shown in FIG. 30 can generate an encryption key 32, and a decryption key generation unit 62 shown in FIG. 31 can generate a decryption key 32, each achieving the same effects as above.

While the invention has been described in detail, the foregoing description is in all aspects illustrative and not restrictive. It is understood that numerous other modifications and variations can be devised without departing from the scope of the invention.

What is claimed is:

1. A signal processor comprising:
a host computer; and
a semiconductor memory detachably connected to the host computer,
the host computer including
a key information generation unit that generates a plurality of key information items by variously modifying original data based on a predetermined rule, the original data being read from a memory that stores the original data being a source for the key information items,
a processing unit that generates encrypted bit strings by encrypting bit strings to be transmitted from the host computer to the semiconductor memory, each bit string being encrypted with a different one of the plurality of key information items generated by the key information generation unit, and
a transmission unit that transmits the bit strings encrypted by the processing unit to the semiconductor memory.

2. The signal processor according to claim 1, wherein
the key information generation unit includes a buffer region which the processing unit refers to, and
the key information generation unit produces a key information table having the plurality of key information items sectioned and arranged with an index value by each key information item, and stores the key information table in the buffer region.

3. The signal processor according to claim 2, wherein
the processing unit designates the index value by a predetermined parameter for reading a key information item corresponding to the index value from the buffer region, and
the key information generation unit further includes a modifying unit that modifies the parameter inputted from the processing unit to change to another parameter.

4. The signal processor according to claim 1, wherein
the processing unit includes a modifying unit that modifies the key information item inputted from the key information generation unit to change to another key information item.

5. The signal processor according to claim 1, wherein
the key information generation unit defines a certain group of key information items out of the plurality of key information items which can be generated as key information available for the processing unit,
the processing unit inputs a predetermined parameter to the key information generation unit for designating a specific key information item to be used out of the group of key information items, and
the key information generation unit selects the specific key information item out of the group of key information items based on the parameter and defined information of the group of key information items in the plurality of key information items, to input to the processing unit.

6. The signal processor according to claim 1, wherein
the key information has a first data length,
the original data has a second data length longer than the first data length,
the key information generation unit generates the key information by extracting sectional data of first-data-length long from the second data length, and
the key information generation unit generates the plurality of key information items by varying sections to be extracted for the sectional data.

7. The signal processor according to claim 1, wherein
the key information generation unit generates the plurality of key information items by shuffling a bit sequence of the original data.

8. The signal processor according to claim 1, wherein
the key information generation unit generates the plurality of key information items by replacing at least a section of a bit sequence of the original data with a bit sequence of a specific section of the original data.

9. The signal processor according to claim 1, wherein
the key information generation unit generates key information to be used in a present process in the processing unit by performing a predetermined operation on the original data with a predetermined bit string.

10. A signal processor comprising:
a host computer; and
a semiconductor memory detachably connected to the host computer,
the host computer including
a receiving unit that receives encrypted bit strings from the semiconductor memory,
a key information generation unit that generates a plurality of key information items by variously modifying original data based on a predetermined rule, the original data being read from a memory that stores the original data being a source for the key information items, and
a processing unit that generates decrypted bit strings by decrypting the encrypted bit strings received by the receiving unit, each encrypted bit string being decrypted with a different one of the plurality of key information items generated by the key information generation unit.

11. The signal processor according to claim 10, wherein
the key information generation unit includes a buffer region which the processing unit refers to, and
the key information generation unit produces a key information table having the plurality of key information items sectioned and arranged with an index value by each key information item, and stores the key information table in the buffer region.

12. The signal processor according to claim 11, wherein
the processing unit designates the index value by a predetermined parameter for reading a key information item corresponding to the index value from the buffer region, and
the key information generation unit further includes a modifying unit that modifies the parameter inputted from the processing unit to change to another parameter.

13. The signal processor according to claim 10, wherein
the processing unit includes a modifying unit that modifies the key information item inputted from the key information generation unit to change to another key information item.

14. The signal processor according to claim 10, wherein
the key information generation unit defines a certain group of key information items out of the plurality of key information items which can be generated as key information available for the processing unit,
the processing unit inputs a predetermined parameter to the key information generation unit for designating a specific key information item to be used out of the group of key information items, and the key information generation unit selects the specific key information item out of the group of key information items based on the parameter and defined information of the group of key information items in the plurality of key information items, to input to the processing unit.

15. The signal processor according to claim 10, wherein
the key information has a first data length,
the original data has a second data length longer than the first data length,
the key information generation unit generates the key information by extracting sectional data of first-data-length long from the second data length, and
the key information generation unit generates the plurality of key information items by varying sections to be extracted for the sectional data.

16. The signal processor according to claim 10, wherein
the key information generation unit generates the plurality of key information items by shuffling a bit sequence of the original data.

17. The signal processor according to claim 10, wherein
the key information generation unit generates the plurality of key information items by replacing at least a section of a bit sequence of the original data with a bit sequence of a specific section of the original data.

18. The signal processor according to claim 10, wherein
the key information generation unit generates key information to be used in a present process in the processing unit by performing a predetermined operation on the original data with a predetermined bit string.

19. A signal processor comprising:
a host computer; and
a semiconductor memory detachably connected to the host computer,
the semiconductor memory including
a key information generation unit that generates a plurality of key information items by variously modifying original data based on a predetermined rule, the original data being read from a memory that stores the original data being a source for the key information items,
a processing unit that generates encrypted bit strings by encrypting bit strings to be transmitted from the semiconductor memory, to the host computer, each bit string being encrypted with a different one of the plurality of key information items generated by the key information generation unit, and
a transmission unit that transmits the bit strings encrypted by the processing unit to the host computer.

20. A signal processor comprising:
a host computer; and
a semiconductor memory detachably connected to the host computer,
the semiconductor memory including
a receiving unit that receives encrypted bit strings from the host computer,
a key information generation unit that generates a plurality of key information items by variously modifying original data based on a predetermined rule, the original data being read from a memory that stores the original data being a source for the key information items, and
a processing unit that generates decrypted bit strings by decrypting the encrypted bit strings received by the receiving unit, each encrypted bit string being decrypted with a different one of the plurality of key information items generated by the key information generation unit.

* * * * *